US012810164B2

(12) United States Patent
Kalantidis et al.

(10) Patent No.: US 12,810,164 B2
(45) Date of Patent: Nov. 24, 2026

(54) DIMENSIONALITY REDUCTION MODEL AND METHOD FOR TRAINING SAME

(71) Applicant: NAVER CORPORATION, Seongnam-si (KR)

(72) Inventors: Ioannis Kalantidis, Grenoble (FR); Diane Larlus, La Tronche (FR); Jon Almazan, Castellón (ES); Carlos Lassance, Meylan (FR)

(73) Assignee: NAVER CORPORATION, Seongnam-si (KR)

( * ) Notice: Subject to any disclaimer, the term of this patent is extended or adjusted under 35 U.S.C. 154(b) by 1119 days.

(21) Appl. No.: 17/929,502

(22) Filed: Sep. 2, 2022

(65) Prior Publication Data

US 2023/0106141 A1 Apr. 6, 2023

Related U.S. Application Data

(60) Provisional application No. 63/252,380, filed on Oct. 5, 2021.

(51) Int. Cl.

| | |
|---|---|
| ***G06N 3/08*** | (2023.01) |
| ***G06F 18/211*** | (2023.01) |
| ***G06N 3/088*** | (2023.01) |
| ***G06N 20/00*** | (2019.01) |

(52) U.S. Cl.

CPC ........... *G06N 3/088* (2013.01); *G06F 18/211* (2023.01); *G06N 20/00* (2019.01)

(58) Field of Classification Search

CPC ................................ G06N 3/08; G06N 20/00

See application file for complete search history.

(56) References Cited

PUBLICATIONS

Kim et al ("A Photo Identification Framework to Prevent Copyright Infringement with Manipulations" Oct. 2, 2021) (Year: 2021).*
Zbontar et al ("Barlow Twins: Self-Supervised Learning via Redundancy Reduction" Jun. 2021) (Year: 2021).*
Dupont et al ("Augmented Neural ODEs" 2019) (Year: 2019).*
Liao et al ("Efficient PSD Constrained Asymmetric Metric Learning for Person Re-identification" 2015) (Year: 2015).*
Park, W., et al., "Relational Knowledge Distillation," 2019 IEEE/CVF Conference on Computer Vision and Pattern Recognition, Long Beach, CA, USA, 2019, pp. 3962-3971.
Pearson, K., "LIII. On lines and planes of closest fit to systems of points in space," The London, Edinburgh, and Dublin Philosophical Magazine and Journal of Science, vol. 2, No. 11, 2010, pp. 559-572.

(Continued)

*Primary Examiner* — Lut Wong
(74) *Attorney, Agent, or Firm* — Greer, Burns & Crain, Ltd

(57) ABSTRACT

Methods and systems for training a dimensionality reduction model. Pairs of proximately located training vectors in a higher dimensional space are generated. Lower dimension vector pairs are generated by encoding first and second training vectors using the dimensionality reduction model, and augmented dimension vector pairs are generated by projecting to an augmented dimensional representation space having a greater number of dimensions. A similarity preservation loss and a redundancy reduction loss are computed and used to optimize parameters of the dimensionality reduction model.

40 Claims, 11 Drawing Sheets

(56) References Cited

PUBLICATIONS

Perozzi, B., et al., "DeepWalk: Online Learning of Social Representations," Proceedings of the 20th ACM SIGKDD International Conference on Knowledge Discovery and Data Mining, New York New York USA: ACM, 2014, pp. 701-710.
Radenović, F., et al., "Revisiting Oxford and Paris: Large-Scale Image Retrieval Benchmarking," 2018 IEEE/CVF Conference on Computer Vision and Pattern Recognition, Salt Lake City, UT, 2018, pp. 5706-5715.
Radenović, F., et al., "Fine-Tuning CNN Image Retrieval with no Human Annotation," Published on arXiv:1711.02512v2, Jul. 10, 2018, 14 pages.
Revaud, J., et al., "Learning with Average Precision: Training Image Retrieval with a Listwise Loss," Published on arXiv:1906.07589v1, Jun. 18, 2019, 10 pages.
Roweis, S., et al., "Nonlinear dimensionality reduction by locally linear embedding," Science, vol. 290, No. 5500, Dec. 22, 2000, pp. 2323-2326.
Russakovsky, O., et al. "ImageNet Large Scale Visual Recognition Challenge," International Journal of Computer Vision, 115(3), 2015, pp. 211-252.
Simonyan, K., et al., "Learning Local Feature Descriptors Using Convex Optimisation," IEEE Transactions on Pattern Analysis and Machine Intelligence, 36(8), 2014 pp. 1573-1585.
Tang, J., et al., "LINE: Large-Scale Information Network Embedding," Proceedings of the 24th International Conference on World Wide Web, Florence Italy: International World Wide Web Conferences Steering Committee, May 2015, pp. 1067-1077.
Tenenbaum, J., et al., "A Global Geometric Framework for Nonlinear Dimensionality Reduction," Science 290, No. 5500, Dec. 22, 2000, pp. 2319-2323.
Thakur, N., et al., "BEIR: a heterogeneous benchmark for zero-shot evaluation of information retrieval models," Published on arXiv:2104.08663v4, Oct. 21, 2021, 24 pages.
Tian, Y., et al., "Contrastive Representation Distillation," Published on arXiv:1910.10699v1, Oct. 23, 2019, 15 pages.
Tian, Y., et al., "Understanding Self-Supervised Learning Dynamics without Contrastive Pairs," International Conference on Machine Learning, 2021, 11 pages.
Tolias, G., et al., "Learning and Aggregating Deep Local Descriptors for Instance-Level Recognition," Computer Vision—ECCV 2020, Lecture Notes in Computer Science, No. 12346, 2020,17 pages.
Tolias, G., et al., "Particular Object Retrieval with Integral Max-Pooling of CNN Activations," Published on arXiv:1511.05879v2, Feb. 24, 2016, 12 pages.
Van Den Oord, A., et al., "Representation Learning with Contrastive Predictive Coding," Published on arXiv:1807.03748v1, Jul. 10, 2018, 13 pages.
Van Der Maaten, L., et al., "Visualizing data using t-SNE," Journal of Machine Learning Research, 9(11), 2008, pp. 2579-2605.
Wachsmuth, H., et al., "Building an Argument Search Engine for the Web," Proceedings of the 4th Workshop on Argument Mining, Copenhagen, Denmark: Association for Computational Linguistics, 2017, pp. 49-59.
Wachsmuth, H., et al., "Retrieval of the Best Counterargument without Prior Topic Knowledge," Proceedings of the Annual Meeting of the Association for Computational Linguistics, 2018, pp. 241-251.
Weinzaepfel, P., et al., "Learning Super-Features for Image Retrieval," ICLR Conference Paper, 2022, 19 pages.
Weyand, T., et al., "Google Landmarks Dataset v2—A Large-Scale Benchmark for Instance-Level Recognition and Retrieval," IEEE/CVF Conference on Computer Vision and Pattern Recognition, Seattle, WA, USA, 2020, pp. 2572-2581.
Wu, Z., et al., "Unsupervised Feature Learning via Non-Parametric Instance Discrimination," IEEE Conference on Computer Vision and Pattern Recognition, 2018, pp. 3733-3742.
Wu, C., "Sampling Matters in Deep Embedding Learning," IEEE International Conference on Computer Vision, Venice, Italy, 2017, pp. 2840-2848.
Xiong, L., et al., "Approximate Nearest Neighbor Negative Contrastive Learning for Dense Text Retrieval," International Conference on Learning Representations, 2021, 16 pages.
You, Y., et al., "Large Batch Training of Convolutional Networks," Published on arXiv.org as 1708.03888v3, Sep. 13, 2017, 8 pages.
You, Y., et al., "When Does Self-Supervision Help Graph Convolutional Networks?," Proceedings of the 37th International Conference on Machine Learning, Online, PMLR 119, 2020, 10 pages.
Zbontar, J., et al., "Barlow Twins: Self-Supervised Learning via Redundancy Reduction," Published on arXiv:2103.03230v3, Jun. 14, 2021, 13 pages.
Zhang, Z., et al., "Principal Manifolds and Nonlinear Dimensionality Reduction via Tangent Space Alignment," Siam J. Sci. Comput., vol. 26, No. 1, 2004, pp. 313-338.
Zhang, C., et al., "How Does SimSiam Avoid Collapse Without Negative Samples? A Unified Understanding with Self-Supervised Contrastive Learning," Conference Paper at ICLR, 2022, 18 pages.
Agrawal, A., et al., "Minimum-Distortion Embedding," Published on arXiv.org as 2103.22559, Aug. 24, 2021, 162 pages.
Amid, E., et al., "TriMap: Large-Scale Dimensionality Reduction Using Triplets," Published on arXiv, as 1910.00204, Oct. 1, 2019, 13 pages.
Babenko, A., et al., "Neural Codes for Image Retrieval," Computer Vision—ECCV 2014, Part I, Lncs 8689, Lecture Notes in Computer Science. Cham: Springer International Publishing, 2014, pp. 584-599.
Babenko, A., et al., "The Inverted Multi-Index," IEEE transactions on pattern analysis and machine intelligence, vol. 37, No. 6, Jun. 2015, pp. 1247-1260.
Bai, J., et al., "Representation Learning for Sequence Data with Deep Autoencoding Predictive Components," ICLR Conference Paper, 2021, 19 pages.
Bajaj, P., et al., "Ms Marco: A Human Generated Machine Reading Comprehension Dataset," Published on arXiv, as 1611.09268, Oct. 31, 2018, 11 pages.
Bardes, A., et al., "VICREG: Variance-Invariance-Covariance Regularization for Self-Supervised Learning," ICLR Conference Paper, 2022, 23 pages.
Belkin, M., et al., "Laplacian Eigenmaps for Dimensionality Reduction and Data Representation," Neural Computation 15, No. 6, Jun. 1, 2003, pp. 1373-1396.
Bengio, Y., et al., "Out-of-Sample Extensions for LLE, Isomap, MDS, Eigenmaps, and Spectral Clustering," NIPS'03: Proceedings of the 16th International Conference on Neural Information Processing Systems, Dec. 2003, 8 pages.
Bondarenko, A., et al., "Overview of Touché 2020: Argument Retrieval," Proc. CLEF, Springer, Sep. 22-25, 2020, pp. 384-395.
Caron, M., et al., "Emerging properties in Self-supervised Vision Transformers," International Conference on Computer Vision 2021, published on arXiv:2104.14294v2, May 24, 2021, 21 pages.
Caron, M., et al., "Unsupervised Learning of Visual Features by Contrasting Cluster Assignments," 34th Conference on Neural Information Processing Systems (NeurIPS 2020), Vancouver, Canada, Published on arXiv.org as 2006.09882, Oct. 15, 2020, 23 pages.
Chen, T., et al., "A Simple Framework for Contrastive Learning of Visual Representations," Proceedings of the 37th International Conference on Machine Learning, Vienna, Austria, PMLR 119, 2020, Published on arXiv.org as 2002.05709, Jun. 30, 2020, 20 pages.
Chen, X, et al., "Improved Baselines with Momentum Contrastive Learning," Published on arXiv, as 2003.04297, Mar. 9, 2020, 3 pages.
Chen, X., et al., "Exploring Simple Siamese Representation Learning," published on arXiv:2011.10566v1, Nov. 20, 2020, 10 pages.
Clark, D., et al., "Unsupervised Discovery of Temporal Structure in Noisy Data with Dynamical Components Analysis," 33rd Conference on Neural Information Processing Systems (NeurIPS 2019), Vancouver, Canada, 2019, 12 pages.
Comon, P., "Independent Component Analysis, a new concept?," HAL Id: hal-00417283, Signal Processing 36, 1994, pp. 287-314.

(56) References Cited

PUBLICATIONS

Cunningham, J., et al., "Linear Dimensionality Reduction: Survey, Insights, and Generalizations," Journal of Machine Learning Research 16, No. 1, 2015, pp. 2859-2900.
Donoho, D., et al., "Hessian eigenmaps: Locally Linear Embedding Techniques for High-Dimensional Data," Proceedings of the National Academy of Sciences 100, No. 10, May 2003, pp. 5591-5596.
Ermolov, A., et al., "Whitening for Self-Supervised Representation Learning," International Conference on Machine Learning. PMLR, 2021,10 pages.
Fang, Z., et al., "Seed: Self-Supervised Distillation for Visual Representation," International Conference on Learning Representations, 2021, 21 pages.
Gao, L., et al., "COIL: Revisit Exact Lexical Match in Information Retrieval with Contextualized Inverted List," Published on arXiv, as 2104.07186, Apr. 14, 2021, 13 pages.
Ge, T., et al., "Optimized Product Quantization," IEEE Transactions on Pattern Analysis and Machine Intelligence 36, No. 4, Apr. 2014, 12 pages.
Goodfellow, I., et al., "Deep Learning," an MIT Press Book, 2016, accessed online at: https://www.deeplearningbook.org/, table of contents, 3 pages.
Gordo, A., et al., "Deep Image Retrieval: Learning Global Representations for Image Search," Published on arXiv, as 1604.01325, Jul. 28, 2016, 21 pages.
Grill, J., et al., "Bootstrap Your Own Latent: A New Approach to Self-Supervised Learning," Published on arXiv.org as 2006.07733, Sep. 10, 2020, 35 pages.
Grover, A., et al., "node2vec: Scalable Feature Learning for Networks," Proceedings of the 22nd ACM SIGKDD International Conference on Knowledge Discovery and Data Mining, San Francisco California USA: ACM, 2016, pp. 855-864.
Hadsell, R., et al., "Dimensionality Reduction by Learning an Invariant Mapping," 2006 IEEE Computer Society Conference on Computer Vision and Pattern Recognition, vol. 2, New York, NY, USA: IEEE, 2006, pp. 1735-1742.
Halko, N., et al., "Finding Structure with Randomness: Probabilistic Algorithms for Constructing Approximate Matrix Decompositions," SIAM Review, vol. 53, No. 2, 2011, pp. 217-288.
He, X., et al., "Locality Preserving Projections," Proceedings of the 16th International Conference on Neural Information Processing Systems, Dec. 2003, pp. 153-160.
He, K., et al., "Momentum Contrast for Unsupervised Visual Representation Learning," 2020 IEEE/CVF Conference on Computer Vision and Pattern Recognition, Seattle, WA, USA: IEEE, 2020, pp. 9726-9735.
Hinton, G., et al., "Distilling the Knowledge in a Neural Network," Published on rXiv:1503.02531v1, Mar. 9, 2015, 9 pages.
Hoogeveen, D., et al., "CQADupStack: Gold or Silver?," Proceedings of the SIGIR 2016 Workshop on Web Question Answering Beyond Factoids, Pisa, Italy, 2016, 7 pages.
Ioffe, S., et al., "Batch Normalization: Accelerating Deep Network Training by Reducing Internal Covariate Shift," Published on arXiv.org as 1502.03167v3, Mar. 2, 2015, 11 pages.
Iscen, A., et al., "Learning with Neighbor Consistency for Noisy Labels," Proceedings of the IEEE/CVF Conference on Computer Vision and Pattern Recognition, 2022, pp. 4672-4681.
Iscen, A., et al., "Fast Spectral Ranking for Similarity Search," 2018 IEEE/CVF Conference on Computer Vision and Pattern Recognition, Salt Lake City, UT, 2018, pp. 7632-7641.
Iscen, A., et al., "Mining on Manifolds: Metric Learning Without Labels," 2018 IEEE/CVF Conference on Computer Vision and Pattern Recognition, Salt Lake City, UT, 2018, pp. 7642-7651.
Iscen, A., et al., "Efficient Diffusion on Region Manifolds: Recovering Small Objects with Compact CNN Representations," 2017 IEEE Conference on Computer Vision and Pattern Recognition, Honolulu, HI, 2017, Poster Presentation, 1 page.
Jégou, H., et al., "Negative Evidences and Co-Occurrences in Image Retrieval: The Benefit of PCA and Whitening," European Conference on Computer Vision, 2012, pp. 774-787.
Jégou, H., et al., "Product Quantization for Nearest Neighbor Search," IEEE Transactions on Pattern Analysis and Machine Intelligence, Institute of Electrical and Electronics Engineers, 2011, 33(1), pp. 117-128.
Johnson, J., et al., "Billion-Scale Similarity Search with GPUs," Published on arXiv:1702.08734v1, Feb. 28, 2017, 12 pages.
Kalantidis, Y., et al. "Locally Optimized Product Quantization for Approximate Nearest Neighbor Search," 2014 IEEE Conference on Computer Vision and Pattern Recognition, Columbus, OH, 2014, pp. 2329-2336.
Kalantidis Y., et al., "TL;Dr Twin Learning For Dimensionality Reduction," published on arXiv.org as 2110.09455, Oct. 18, 2021, 20 pages.
Khattab, O., et al., "ColBERT: Efficient and Effective Passage Search via Contextualized Late Interaction over BERT," Proceedings of the 43rd International ACM SIGIR Conference on Research and Development in Information Retrieval, Virtual Event China: ACM, 2020, pp. 39-48.
Kipf, T., et al., "Semi-Supervised Classification with Graph Convolutional Networks," Published on arXiv:1609.02907v2 , Feb. 22, 2017, 14 pages.
Krukal, J., "Nonmetric Multidimensional Scaling: A Numerical Method," Psychometrika, vol. 29, No. 2, Jun. 1964, pp. 515-129.
Lin, S., et al., "Distilling Dense Representations for Ranking Using Tightly-Coupled Teachers," Published on arXiv:2010.11386v1, Oct. 21, 2020, 7 pages.
Liu, C., et al., "Guided Similarity Separation for Image Retrieval," 33rd Conference on Neural Information Processing Systems, 2019, 11 pages.
McInnes, L., et al., "UMAP: Uniform Manifold Approximation and Projection for Dimension Reduction," Published on arXiv:1802.03426v2, Dec. 6, 2018, 51 pages.
Noh, H., et al., "Large-Scale Image Retrieval with Attentive Deep Local Features," 2017 IEEE International Conference on Computer Vision, Venice, Italy, 2017, pp. 3476-3485.

* cited by examiner

```
# X: training set of M D-dimensional vectors
# D: input dimension
# d': projector's output dimension
# d: encoder's output dimension

# B: batch size
# k: number of neighbours
# compute_knn_graph: calculates the k nearest neighbours of each vector
# RandomBatchSampler: randomly samples batch_size indices

# Initialization
model = initialize_model()  # initialize both encoder f and projector g
N = compute_knn_graph(X, k)  # returns matrix of size Mxk

# Training
for e in num_epochs:
  for indices in RandomBatchSampler(len(X), batch_size=B):
    x = X[indices]  # BxD
    y = X[random_sample(N[indices], 1)]  # BxD
    x = model(x)  # Bxd'
    y = model(y)  # Bxd'
    loss = BarlowTwinsLoss(x, y)
    loss.backward()
    model.update()

model.discard_projector()  # discard projector g
Z = model(X)  # Mxd
```

FIG. 5

| Task | Retrieval dataset (Metric) | Representation | | Dim. red. | Result Summary | | |
|---|---|---|---|---|---|---|---|
| | | Model | Dataset | dataset | TLDR ($d = 128$) | vs PCA$_w$ ($d = 128$) | vs Orig. ($D = 2048$) |
| Landmark Retrieval | $\mathcal{R}$Oxford (*mAP*) | GeM-AP (ResNet-50) | Landmarks | GLD-v2 † | 0.49 | ↑ 4.1% | ↑ 0.7% |
| | | DINO (ResNet-50) | ImageNet † | ImageNet † | 0.22 | ↑ 2.9% | ↓ 0.8% |
| | | | | GLD-v2 † | 0.29 | ↑ 3.7% | ↑ 6.8% |
| | | DINO (ViT-S/16) | ImageNet † | ImageNet † | 0.25 | ↑ 2.6% | ↓ 0.2%‡ |
| | | | | GLD-v2 † | 0.31 | ↑ 2.7% | ↑ 5.4%‡ |
| | | | GLD-v2 † | GLD-v2 † | 0.43 (256) | ↑ 1.9% | ↑ 4.6%‡ |
| | $\mathcal{R}$Paris (*mAP*) | GeM-AP (ResNet-50) | Landmarks | GLD-v2 † | 0.67 | ↑ 1.2% | ↑ 0.6% |
| ImageNet Retrieval | ImageNet (*k*-NN *Top-1 Acc.*) | DINO (ResNet-50) | ImageNet † | ImageNet † | 68.4 (512) | ↑ 1.3% | ↑ 0.9% |
| | | DINO (ViT-S/16) | ImageNet † | ImageNet † | 74.8 (256) | ↑ 0.6% | ↑ 0.3%‡ |
| Argument Retrieval | ArguAna (*Rec@100*) | ANCE (BERT) | MSMarco | WT20† | 94.5 (64) | ↑ 0.8% | ↑ 0.5%§ |

FIG. 6

DIMENSIONALITY REDUCTION MODEL AND METHOD FOR TRAINING SAME

PRIORITY CLAIM

This application claims priority to and benefit from U.S. Provisional Patent Application Ser. No. 63/252,380, filed Oct. 5, 2021, which application is incorporated in its entirety by reference herein.

FIELD

The present disclosure relates generally to machine learning, and more particularly to methods and systems for training neural network models that reduce the dimensionality of an input.

BACKGROUND

Many machine learning applications process feature vectors having many dimensions. However, manipulating high dimensionality vectors has several drawbacks. It is thus often useful or necessary to work with lower dimensionality versions of such vectors. In such cases, a dimensionality reduction approach can be applied.

Dimensionality reduction can be a crucial component, or even a sole component, of a machine learning system configured to perform one or more tasks. For example, dimensionality reduction can reduce required computational cost or training time for any uses and applications that follow. Working with dimensionally reduced data can improve training or task performance in some cases. Dimensionality reduction can itself be a final goal, such as for compression tasks. It can also ease an algorithm's interpretation by selecting/extracting meaningful dimensions. Additionally, reducing a feature set to a small number (e.g., only 2 or 3) output dimensions allows for a very intuitive visualization of a collection of samples.

Applying dimensionality reduction inherently incurs a loss. It is important to define which properties from the original space should be preserved in the target space. Popular approaches for dimensionality reduction, such as those provided by the principal component analysis (PCA) algorithm or the t-SNE visualization tool, attempt to preserve a global or local structure of an initial manifold.

However, such methods come with several drawbacks. For instance, PCA is limited to a linear projection. PCA also relies on an assumption that dimensions with larger variance are more important, which often does not hold, and it focuses on the global structure at the expense of the local one. t-SNE better encodes the local structure, but it poorly preserves densities and distances.

SUMMARY

Provided herein, among other things, are methods and systems performed by a processor and memory for training a dimensionality reduction model. Dimensionality reduction models implemented using a processor and trained using example methods are also provided. The dimensionality reduction model receives an input vector in a D-dimensional representation space and generates an output vector in a d-dimensional representation space, where D is greater than d. The dimensionality reduction model is defined by one or more learnable parameters.

A batch of b positive pairs (i.e., samples that are similar in some measured sense, or more similar in some measured sense than other samples) of training vectors in the D-dimensional space is generated. Each positive pair includes a first training vector and a second training vector. Generating comprises, for each positive pair: selecting the first training vector from a set of training vectors in the D-dimensional representation space; and identifying a second training vector in the D-dimensional space that is proximate to the first training vector.

A batch of lower dimension vector pairs is generated by encoding the first and second training vectors in each of the batch of b positive pairs to the d-dimensional representation space using the dimensionality reduction model to provide first and second lower dimension vectors, respectively. A batch of b augmented dimension vector pairs is generated by projecting the first and second lower dimension vectors in each of the batch of b lower dimension vector pairs to an augmented dimensional representation space having dimension d' to provide first and second augmented dimension vectors respectively, where d' is greater than d.

A similarity preservation loss and a redundancy reduction loss between the first and second augmented dimension vectors are computed over the batch of b augmented dimension vector pairs, and the parameters of the dimensionality reduction model are optimized to minimize a total loss based on the computed similarity preservation loss and the computed redundancy reduction loss.

According to a complementary aspect, the present disclosure provides a computer program product, comprising code instructions to execute a method according to the previously described aspects; and a computer-readable medium, on which is stored a computer program product comprising code instructions for executing methods according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 5 shows an example pseudocode for performing a training method.

FIG. 6 shows a summary of tasks, models, and results for linear dimensionality reduction. † denotes the use of the dataset without labels. GeM-AP and DINO models are provided from Revaud et al., 2019, and Caron et al., 2021, respectively. Different values of d for example methods (TLDR) and PCA are denoted in parentheses next to the TLDR performance when d≠128. ‡ indicates input space D=384 for ViT-S/16. ∮ indicates input space D=768 for BERT.

FIG. 9 shows mAP on ROxford as a function of the output dimensions d using representations from DINO pretrained on ImageNet, where dimensionality reduction is learned on either ImageNet (dashed lines) or GLD-2 (solid lines), and FIG. 10 shows performance for example (TLDR) methods and PCA methods when learning dimensionality reduction on GLD-v2 over representations from a DINO model pretrained on GLD-v2. No labels were used at any stage.

FIG. 11 shows Top-1 accuracy as a function of the output dimensions d for k-NN retrieval on ImageNet following the protocol from Caron et al., 2021, and using DINO ResNet-50 and ViT representations trained on ImageNet. FIG. 12 shows mAP performance on ROxford after PQ quantization of the reduced features (d=128), as a function of the output vector size (in Bytes).

In the drawings, reference numbers may be reused to identify similar and/or identical elements.

DETAILED DESCRIPTION

Figure 1:
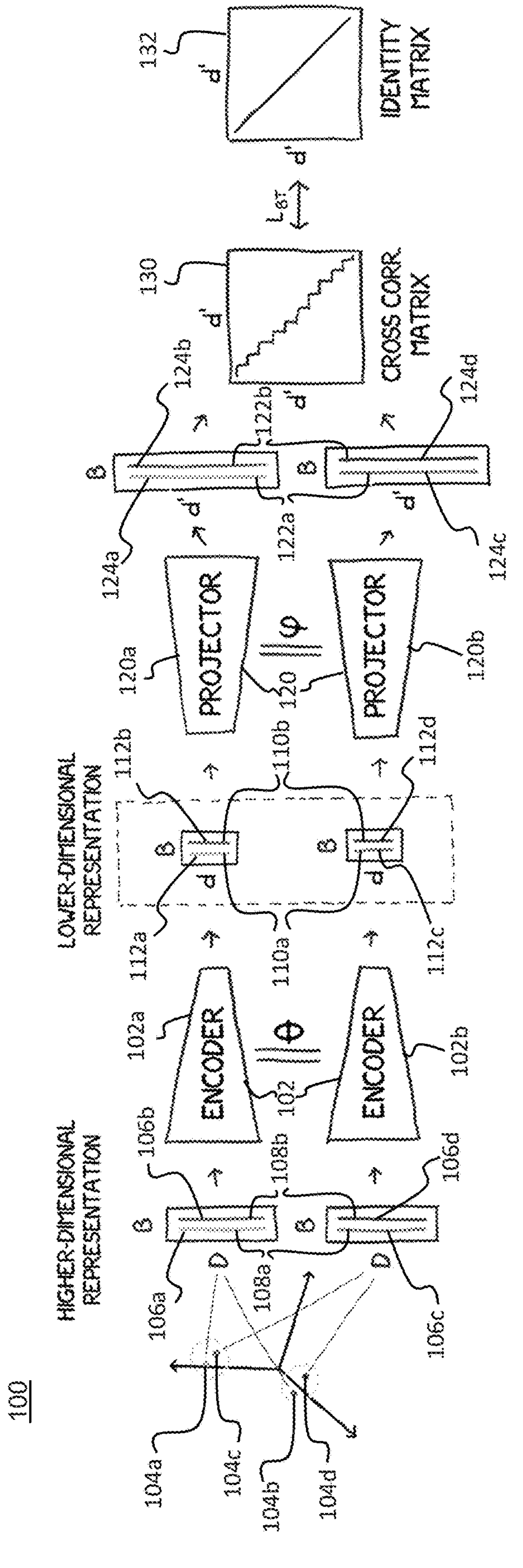
FIG. 1 shows an example system for training a dimensionality reduction function.

Given an input space (initial representation space), e.g., an input vector space, it is useful to learn in an unsupervised manner an embedding function such as a dimensionality reduction function that transforms vectors from the input space into lower dimensionality vectors while preserving properties of the input space, such as proximity or the local neighborhood as defined in the input space. This neighborhood-preserving property is crucial for many applications of dimensionality reduction, such as but not limited to visualization (when the output space is 2D or 3D) or compression, to avoid the problems associated with dimensionality or to reduce the memory and computational cost of subsequent tasks. Other example tasks for which dimensionality reduction is useful include indexing and retrieval.

Dimensionality reduction methods can be divided into linear and non-linear approaches. Dimension reduction can be obtained by performing feature selection. Feature selection approaches select a small subset of dimensions, based on an unsupervised or supervised objective. These approaches are helpful for interpretation, but they are typically outperformed for other tasks by methods directly learning a new representation space. The latter methods learn a transformation of the data.

The most common feature projection approach currently in the art is principal component analysis (PCA), which is a linear projection function, but many non-linear extensions of PCA exist, such as Kernel PCA or Graph-based PCA. Autoencoders have also been used for this task. Non-linear dimensionality reduction methods t-SNE and UMAP are specifically designed for visualization and are typically applied to project in 2D or 3D. These methods have been successful for small output dimensions (d=2 or 3) but are difficult to scale when the number of output dimensions is greater than a handful of dimensions. It can even be infeasible to run even recent, GPU-based and scalable implementations of manifold learning for output dimensions in the hundreds (e.g., d=128; 256).

Example methods and systems provided herein train a dimensionality reduction model (that is, learn the parameters of a processor-based parametric function that takes a high dimensional representation vector as input and outputs a vector in a lower dimensional space) that can preserve the local neighborhood of data samples by design. An example dimensionality reduction model can be embodied in a dimensionality reduction function, e.g., provided by or incorporated in an encoder. Such methods can be applied for linear and non-linear projections, are highly scalable, can provide out-of-sample generalization, and can provide output spaces with high linear separability across classes. Training can be performed using unlabeled vectors from the original representation space, avoiding the need for prior knowledge of the feature space, though prior knowledge and/or human-provided supervision signals can be exploited.

Self-supervised learning (also referred to as self-supervised representation learning) has been shown to produce effective and transferable representation functions by learning models that encode invariance to artificially created distortions. The success of such methods is dependent upon the set of distortions that is chosen. For images, priors are utilized to hand-craft pixel distortions like color jittering, cropping, rotations, contrast and brightness changes. Learning representations invariant to such image distortions while also contrasting (discriminating) representations between different images has proved successful. However, in some scenarios it may be hard or even impossible to define an appropriate set of distortions by hand.

Example methods and systems herein can provide dimensionality reduction method for generic input spaces, such as but not limited to trustworthy (even potentially black box) representations. Example training methods can be performed with only the prior knowledge that data lies on a reliable manifold (local geometry of the training set) whose neighborhood is desirable to preserve. However, example training methods can also use additional prior knowledge if desired.

Example training methods use pairs of proximately located input vectors, such as nearest neighbors, from a training set in combination with a redundancy reduction loss to learn a dimensionality reduction model that can produce representations that are invariant to distortions. Such methods can effectively and in an unsupervised manner learn low-dimensional spaces where local neighborhoods of the input space are preserved. Example methods can use, but need not use, a simple, optionally offline nearest neighbor computation that can be highly approximated without significant loss in performance, along with a straightforward learning process using, e.g., stochastic gradient descent. Further, such methods do not require mining negative samples (i.e., samples that are different in some measured sense, or less similar in some measured sense than other samples) to contrast, eigen-decompositions, or cumbersome optimization solvers, unlike some manifold learning methods known in the art.

As dimension reduction is a core technique of many machine learning systems, the tasks that can benefit from example dimensional reduction methods herein are numerous. Example tasks include, but are not limited to, retrieval tasks such as text retrieval, image retrieval, cross-modal retrieval, artificial intelligence (ai)-powered searches, “smart lens” searches, localization tasks (e.g., for robotics platforms), data visualization, question answering, and many others.

Turning now to the drawings, FIG. 1 shows an example system 100 for training a dimensionality reduction model. The dimensionality reduction model in the system 100 is embodied in or a component of an encoder 102, which is configured to receive data such as can be represented by an input vector, in an input space that is a higher dimensional representation space, e.g., a D-dimensional space and generate an output vector in an output space that is a lower-dimensional representation space, e.g., a d-dimensional space, where D is greater than d. The input vectors can be, for instance, provided by one or more datapoints 104*a*, 104*b*, 104*c*, 104*d*, each of which can be defined by a set of D dimensions.

The datapoints 104*a*-104*d* can represent inputs that are used for a variety of processing tasks. For instance, each datapoint 104*a*-104*d* can represent a token (e.g., a word, phrase, sentence, paragraph, symbol, etc.), a document, an image, an image patch (arbitrary part of an image), a video, a waveform, a 3D model, a 3D point cloud, embeddings of tabular data, etc.

The datapoints can be provided from various sources. For training the dimensionality reduction model 102, the datapoints 104*a*-104*d* can be provided from any suitable source. For training an end-to-end system for performing a task where the system includes the dimensionality reduction model 102, datapoints can be sourced from a training dataset for training the system to perform the task. For performing the task during runtime (inference), a datapoint can be generated as an input to the system from a computing device.

The dimensionality reduction model 102 can be embodied in a neural network that is defined by one or more trainable parameters. Example dimensionality reduction models can be embodied in or include linear encoders, non-linear encoders, factorized linear encoders, multi-layer perceptrons (MLPs), or a combination of any of these. Features of example dimensionality reduction models are provided herein.

Figure 2:
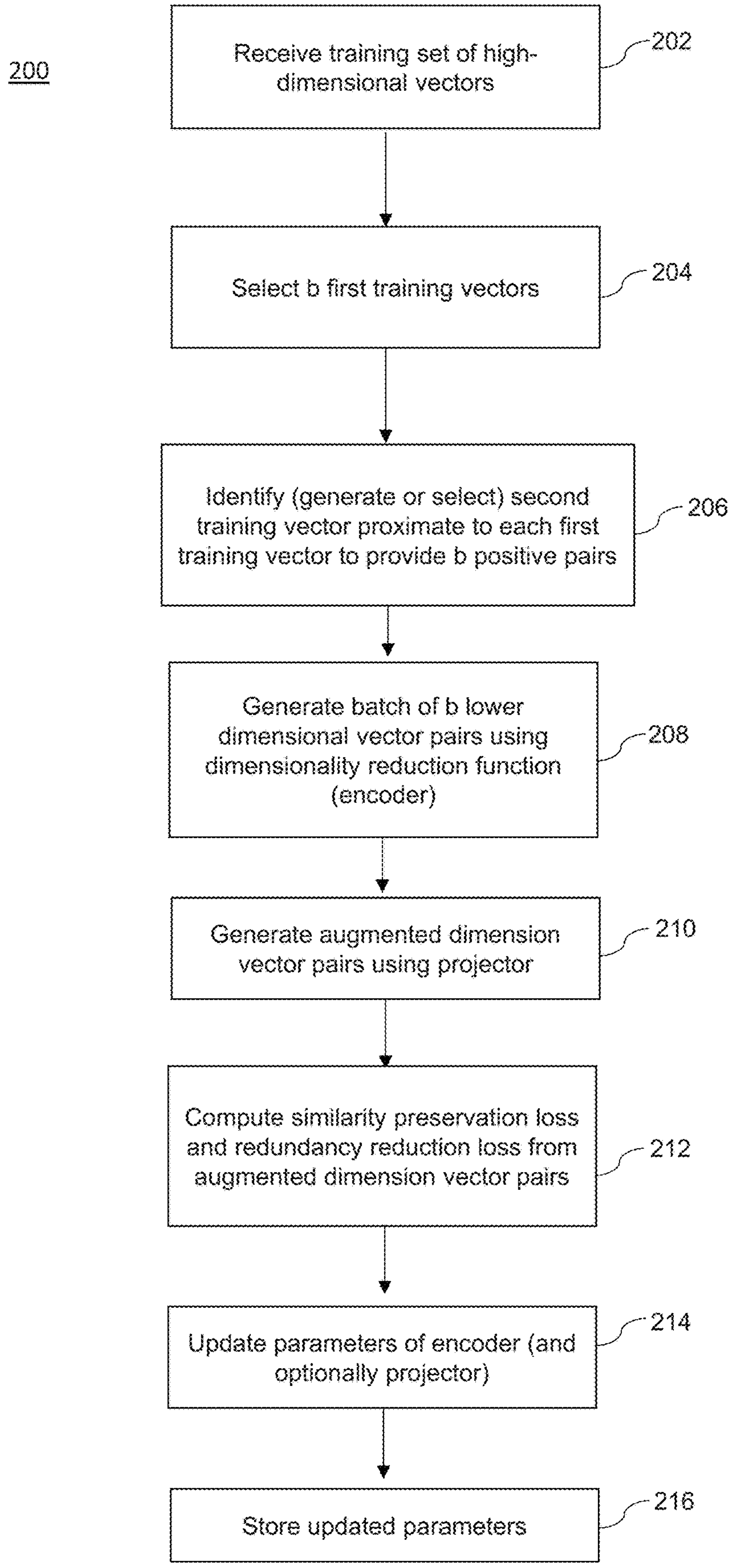
FIG. 2 shows an example method for training a dimensionality reduction function.

FIG. 2 shows an example method 200 for training the dimensionality reduction model 102. In the method 200, a batch of b positive pairs of training vectors are generated in a D-dimensional space (a higher dimensional representation).

For example, a training set of high-dimensional (D-dimensional) vectors $\mathcal{X}$ can be provided at 202, e.g., input to the system 100. The training set of high-dimensional vectors can be, for instance, core representations of feature sets, which can be generated offline or as part of an online encoding process, such as by using a representation learning model that processes input (e.g., raw) data. The dimensionality reduction model, the representation learning model, and/or other models in the system 100 may be initialized, such as but not limited to by setting model parameters of a pretrained model as initial parameters (e.g., for fine-tuning), or by selecting initial model parameters (e.g., randomly or otherwise). Combinations of pretrained (at various stages of training) and to-be-trained models can be provided, and models may be trained in combination or in sequence. Example model parameters include weights and biases. In addition to training, validation and test datasets may also be used for validation and testing as will be appreciated by an artisan. Model architectures may be updated as a result of training, validation, or testing. Training hyperparameters can be selected and initialized as will be appreciated by an artisan having reference to the present disclosure.

For each of the b positive pairs, a first training vector x in the D-dimensional space can be selected at 204 from the training set of high-dimensional vectors (that is, $x \in \mathcal{X}$). For instance, for a mini-batch size b=2 (though a typical batch size can be significantly larger), datapoints 104*a* and 104*b* from the training set can be represented by D-dimensional input vectors 106*a* and 106*b*, and these vectors 106*a* and 106*b* can provide first training vectors for each of two positive pairs 108*a* and 108*b*, respectively. This selection can be based on, for instance, randomly sampling each vector in the batch from the training set.

To train the dimensionality reduction model 102 for invariance to changes (e.g., distortions, alterations, augmentations, transformations, etc., whether intentional or unintentional) in the input vectors when encoding, a second training vector is identified (e.g., generated or selected) in the D-dimensional space at 206 that is proximate to the first training vector. In some known training methods for dimensionality reduction, distortions may be provided via handcrafting, which requires prior knowledge of features. In example methods herein, the second training vector that is proximate to the first training vector provides a distorted or pseudo-distorted version of the first training vector. “Proximate” refers to the second training vector being closer to the first training vector than other training vectors in the training set, i.e., a neighbor, as determined by one or more metrics. The second training vector can be identified by generating or selecting without prior knowledge of features. Instead, according to example methods herein, comparing a datapoint and its nearest neighbors can be used as a “distortion” for learning, providing an approximation of local manifold geometry. However, it is contemplated that prior knowledge can be used in combination with other example techniques described herein for generating a proximate training vector.

In some example methods, the proximate training vector can be generated as a synthetic neighbor, such as by modifying the first training vector. An example modification is adding noise, e.g., Gaussian noise. Training the dimensionality reduction model 102 using synthetic neighbors can provide unsupervised training.

In other example methods, the proximate training vector is generated or selected using other input vectors in the training set. For instance, a training vector that is proximate to the first training vector may be selected from the remaining input vectors in the training set (the input vectors other than the first training vector).

In some example methods, a set of k nearest neighbors to the first training vector is determined with respect to a metric to provide a neighborhood of the selected training vector, where k is a selectable parameter. This metric can be, for instance, a Euclidean distance between training vectors, a non-Euclidean distance between training vectors, an adaptive pair (e.g., defined by a radius), etc. This metric and selection of nearest neighbors defines a neighborhood of the first training vectors. The set of k nearest neighbors (e.g., $\mathcal{N}_k(x)$) can be calculated for every $x \in \mathcal{X}$ (in example methods, every input vector x will eventually be part of a batch b within a particular epoch). This calculation can be performed offline or during training time. A graph k-NN can be built from the k nearest neighbors.

Then, the second training vector is selected from this neighborhood (i.e., from the determined set of k nearest neighbors). For instance, the second training vector may be provided by sampling, e.g., randomly, an input vector y from the determined set of k nearest neighbors to provide a positive pair (x, y).

For example, in FIG. 1, datapoints 104*a* and 104*b* are represented by D-dimensional input vectors 106*a* and 106*b*, which provide first input vectors for each of two positive pairs 108*a* and 108*b*. Neighboring datapoint 104*c* is proximate to datapoint 104*a*, and is represented by second input vector 106*c* of positive pair 108*a*. Similarly, neighboring datapoint 104*d* is proximate to datapoint 104*b*, and is represented by second input vector 106*d* of positive pair 108*b*. Thus, in FIG. 1, two positive pairs (b=2) 108*a* (i.e., input vectors 106*a* and 106*c* corresponding to datapoints 104*a* and 104*c*, respectively) and 108*b* (i.e., input vectors 106*b* and 106*d* corresponding to datapoints 104*b* and 104*d*, respectively) are provided.

The positive pairs 108*a* and 108*b* are then used to train the dimensionality reduction model 102 for preservation of similarity between the first and second input vectors (invariance to changes) in each positive pair, and further for dimensional redundancy reduction between the same first and second input vectors. Generally, this training learns (e.g., updates) the parameters of the dimensionality reduction function by minimizing a loss that tries to de-correlate a batch-averaged cross-correlation matrix across dimensions, applied after a projector (e.g., a projector function).

For example, the dimensionality reduction model (encoder) 102 (defined by trainable parameters 9) is used to generate at 208 a batch of b (here, two) lower dimension vector pairs by encoding the first training vectors 106*a* and 106*b* and the second training vectors 106*c* and 106*d*, in each of the positive pairs 108*a* and 108*b* to the d-dimensional representation space, where d<<D. For clarity of illustration, 102*a* indicates the encoding by the encoder 102 of the first training vectors 106*a* and 106*b*, and 102*b* indicates the encoding by the (e.g., same, though it is possible that parallel processing could be used) encoder 102 of the second training vectors 106*c* and 106*d*. The dimensionality reduction (encoding) function may include or be embodied in a linear function, a non-linear activation function, a factorized linear function, a multilayer perceptron (MLP), or any combination.

In an example linear function, a vector x (D-dimensional) is input to a linear layer (y=Wx+b). The result is a generated output vector y (d-dimensional).

In an example factorized linear encoder having L layers, a vector x (D-dimensional) is provided. For each of the L layers, a linear layer (e.g., $y_i=W^ix+b^i$, where i=1 . . . L) processes the input vector x and the result is batch normalized by a batch normalization layer. The linear and batch normalization layers are each repeated L times to provide an output vector $y_L$ (d-dimensional).

In an example MLP encoder having L layers, a vector x (D-dimensional) is provided. For each of the L layers, a linear layer (e.g., $y_i=W^ix+b^i$, where i=1 . . . L) processes the input vector x and the result is batch normalized by a batch normalization layer and an activation function (e.g., ReLU). The linear batch normalization layers, and the activation function are each repeated L times to provide an output vector $y_L$ (d-dimensional).

The output of the dimensionality reduction model 102 is a batch of b (for illustration, two) lower dimension vector pairs 110*a* and 110*b*. The lower dimension vector pairs 110*a* and 110*b* include first 112*a* and 112*b* (shown being encoded by the encoder 102 at 102*a*) and second 112*c* and 112*d* (shown being encoded by the encoder 102 at 102*b*) lower dimension vectors in the d-dimensional space, respectively.

To enhance example training methods, such as by providing additional capacity for dimensional redundancy reduction, a projector 120 generates at 210 augmented dimension vector pairs 122*a* and 122*b* by projecting the first 112*a* and 112*b* and second 112*c* and 112*d* lower dimension vectors in each of the batch of b lower dimension vector pairs 110*a* and 110*b* to an augmented dimensional representation space having dimension d'. Here, d' is greater (e.g., much greater) than d (d'>>d). For clarity of illustration, 120*a* indicates generation by the projector 120 of the lower dimension vectors 112*a* and 112*b*, and 120*b* indicates the generation by the (e.g., same, though it is possible that parallel processing could be used) projector 120 of the lower dimension vectors 112*c* and 112*d*. The augmented dimension vector pairs 122*a* and 122*b* include first augmented dimension vectors 124*a* and 124*b* (shown being generated by the projector 120 at 120*a*) and second augmented vector pairs 124*c* and 124*d* (shown being generated by the projector 120 at 120*b*), respectively.

The projector 120 can be provided, e.g., as a projector head for the system 100, during dimensionality reduction training, and can be removed after training. Example projectors 120 can include or be embodied in a linear projector, a non-linear projector, a multi-layer perceptron (MLP) or any combination. The projector 120 may be defined, for instance, by trainable parameters φ. Additional features of example projectors are provided herein.

A similarity preservation loss and a redundancy reduction loss are computed at 212 between the first augmented dimension vectors 124*a* and 124*b* and second augmented dimension vectors 124*c* and 124*d* over the batch of b augmented dimension vector pairs 122*a* and 122*b*. The computed similarity preservation loss and redundancy reduction loss are combined, optionally with a weighting or offset parameter, to provide a total loss. The provided total loss is used at 214 to update the parameters θ of the dimensionality reduction model 102, and optionally parameters of the projector 120, e.g., using stochastic gradient descent.

The similarity preservation loss has the objective of maintaining invariance to changes (e.g., distortions, augmentations, transformations, alterations, etc.) during dimensionality reduction. It can be computed, for instance, by computing a cross-correlation between the first 124*a* and 124*b* and second 124*c* and 124*d* augmented dimensional vectors over the batch of b augmented dimension vector pairs 122*a* and 122*b* for common dimensions, such as dimension $0 \le i \le d'$.

The redundancy reduction loss has the objective of reducing dimensional redundancy. It can be computed, for instance, by computing a redundancy between dimensions in the first augmented dimensional vectors 124*a* and 124*b* and the second augmented dimensional vectors 124*c* and 124*d* over the batch of b augmented dimension vector pairs 122*a* and 122*b*. This computation can be performed by computing a cross-correlation between the first 124*a* and 124*b* and second 124*c* and 124*d* augmented dimensional vectors over the batch of b augmented dimension vector pairs 122*a* and 122*b* for dimensions other than the common dimensions.

For instance, FIG. 1 shows a cross-correlation matrix 130 of size d'×d' computed between the first 124*a* and 124*b* and second 124*c* and 124*d* augmented dimensional vectors averaged over the batch of b augmented dimension vector pairs 122*a* and 122*b*. The cross-correlation matrix 130 can be normalized such that the optimal sum at common dimensions ($C_{ii}$) across the batch b is equal to one (identity) to compute similarity preservation loss, while the optimal sum at dimensions other than common dimensions $C_{ij}$ across the batch b is equal to zero to compute redundancy reduction loss, as shown in the identity matrix 132. The total loss can then be based on the combined similarity preservation loss and the redundancy reduction loss, with any offset or weighting as may be determined by a selectable parameter.

The updated dimensionality reduction model 102, e.g., including the updated parameters θ learned during training, can be stored at 216 in any suitable storage, e.g., non-volatile storage media. The trained dimensionality reduction model 102 can then be used to dimensionally reduce a new feature set, alone or along with other encoding features. The updated parameters of the projector 120 may optionally also be stored.

Figure 3:
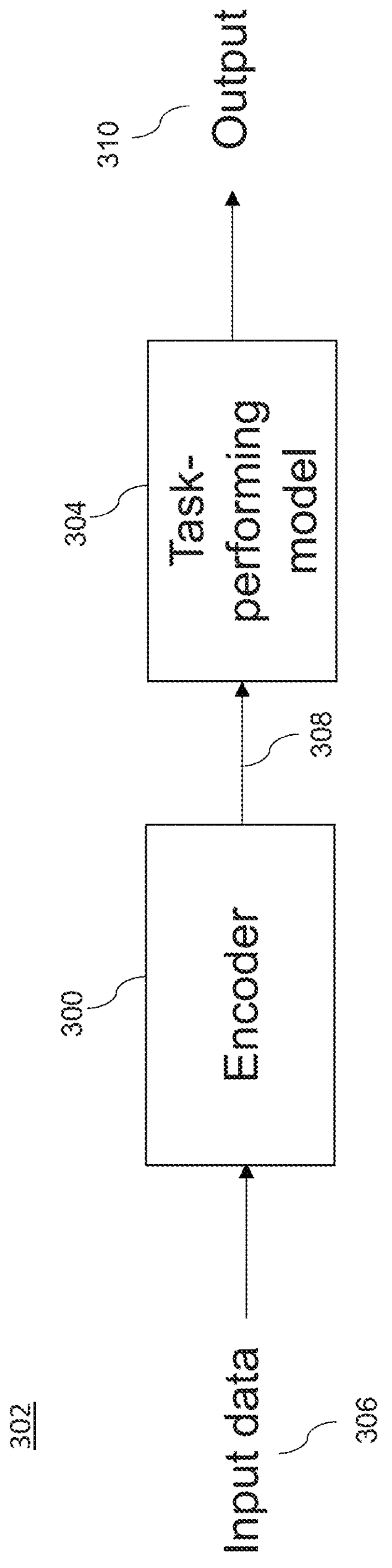
FIG. 3 shows a system for performing a task using a trained dimensionality reduction model.

For instance, the trained dimensionality reduction model may be part of or otherwise integrated into a processor-based system or architecture for performing a task. As illustrated in FIG. 3, for example, a dimensionality reduction model, e.g., an encoder 300, is combined with a task performing model 304 as part of an end-to-end system 302 for performing a task. Alternatively, the trained encoder 300 may provide an encoding function as a complete task in and of itself. If the encoder 300 is part of the larger end-to-end system 302, the trained dimensionality reduction model may be used for training the end-to-end system or used during inference (e.g., performance of one or more tasks downstream of the encoder). An input, e.g., input data 306 to the encoder 300, for instance, can be an input vector in the D-dimensional space. The input vector can be generated and preprocessed before being introduced into the encoder. For instance, the input vector can be normalized if desired.

The trained dimensionality reduction model 300 can generate an encoded vector output in the lower dimensional (d-dimensional) space, and output an encoded output vector 308 for downstream processing by the task performing model 304, or directly as an end result. The encoded output vector 308 and/or an output 310 generated downstream by other components of the task-performing model 304 (e.g., a classification, a label, an action command, a decision, a retrieved document (text, image, etc.), an output document, an answer to a question, a translation, a recommendation, an output signal, an index, etc.) may also be stored, printed, displayed, etc.

It is not required that the encoding method performed by the trained dimensionality reduction model (e.g., during testing or runtime) be identical to the encoding method used during training. For instance, if an encoder is a factorized linear encoder, it is contemplated that during training the dimensionality reduction model 102 may employ non-linear encoding methods, or a combination of non-linear and linear encoding methods, while the trained dimensionality reduction model may employ linear encoding methods (during testing, for instance, the batch normalization layer that is non-linear during training can be mathematically absorbed into linear layers, making the resulting encoder linear). In other example methods, the encoder may be linear both during training and after training, or non-linear both during training and after training. Further, the projector 120 can be used during training of the dimensional reduction model 102, but it can be omitted in the encoder 300 once the dimensional reduction model is trained.

Network Architecture

Figure 4:
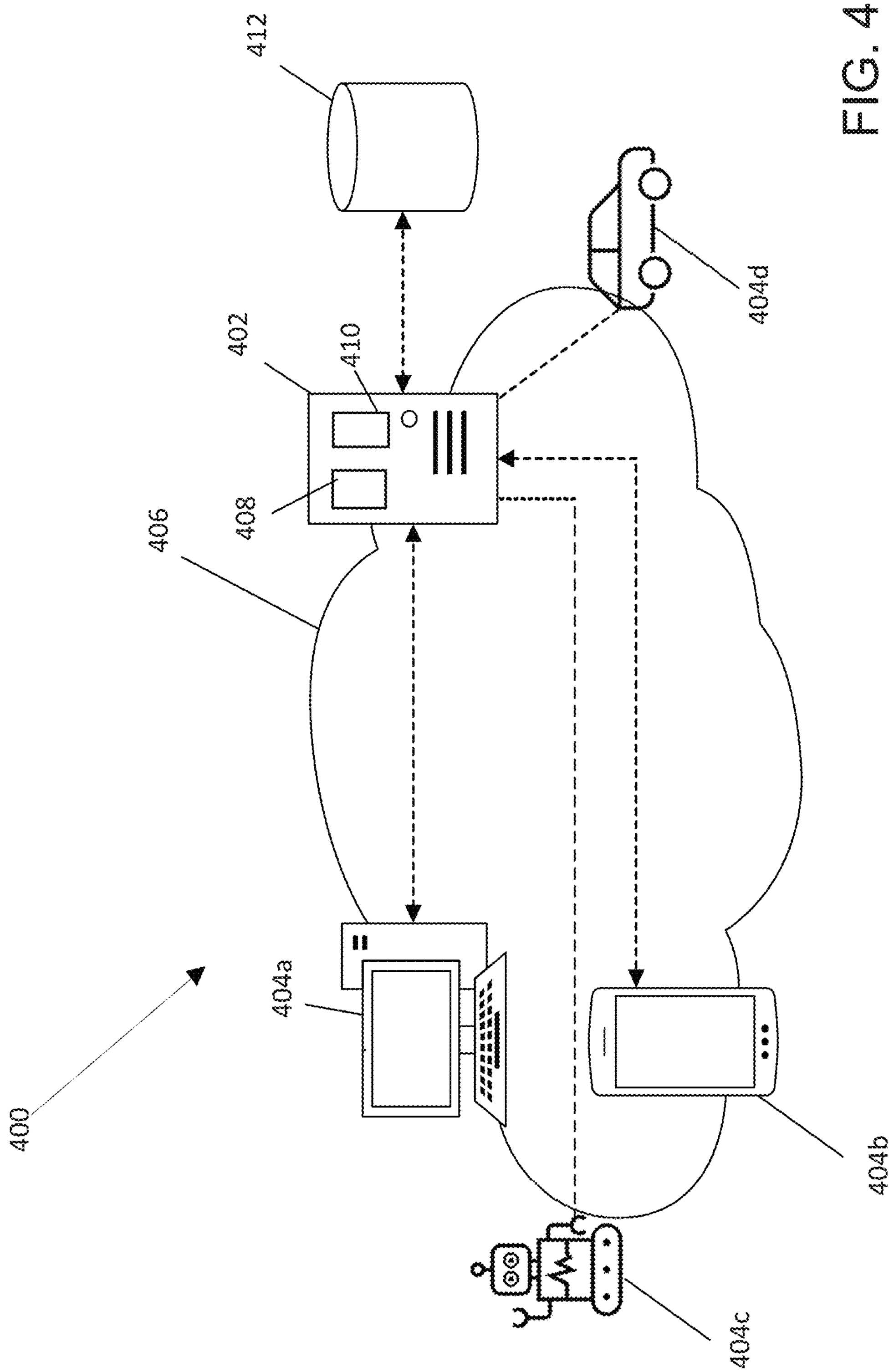
FIG. 4 shows an example network architecture for performing example methods.

Systems, methods, and embodiments disclosed herein may be implemented within an architecture 400 such as that illustrated in FIG. 4 or any portion thereof. The example architecture 400 includes a server 402 and one or more client devices 404*a*, 404*b*, 404*c*, 404*d* that communicate over a network 406 which may be wireless and/or wired, such as the Internet, for data exchange. The server 402 and the client devices 404*a-d* can each include a processor, e.g., processor 408 and a memory, e.g., memory 410 (shown by example in server 402), such as but not limited to random-access memory (RAM), read-only memory (ROM), hard disks, solid state disks, or other non-volatile storage media. Memory 410 may also be provided in whole or in part by external storage in communication with the processor 808.

The dimensionality reduction training system 100 in FIG. 1, for instance, may be implemented by a processor such as the processor 408 or other processor in the server 402 and/or client devices 404*a*-404*d*. It will be appreciated that the processor 408 can include either a single processor or multiple processors operating in series or in parallel. Memory used in example methods may be embodied, for instance, in memory 410 and/or suitable storage in the server 402, client devices 404*a-d*, a connected remote storage 412 (shown in connection with the server 402, but can likewise be connected to client devices), or any combination. Memory can include one or more memories, including combinations of memory types and/or locations. Memory can be stored in any suitable format for data retrieval and processing.

Server 400 may include, but are not limited to, dedicated servers, cloud-based servers, or a combination (e.g., shared). Data streams may be communicated from, received by, and/or generated by the server 402 and/or the client devices 404*a-d*.

Client devices 404*a-d* may be any processor-based device, terminal, etc., and/or may be embodied in a client application executable by a processor-based device, etc. Client devices may be disposed within the server 402 and/or external to the server (local or remote, or any combination) and in communication with the server. Example client devices 404*a-d* include, but are not limited to, computers 404*a*, mobile communication devices (e.g., smartphones, tablet computers, etc.) 404*b*, robots or other agents 404*c*, autonomous vehicles 404*d*, wearable devices (not shown), virtual reality, augmented reality, or mixed reality devices (not shown), or other processor-based devices. Client devices 404*a-d* may be, but need not be, configured for sending data to and/or receiving data from the server 402, and may include, but need not include, one or more output devices, such as but not limited to displays, printers, etc. for displaying or printing results of certain methods that are provided for display by the server. Client devices may include combinations of client devices.

In an example training method, the server 402 or client devices 404*a-d* may receive input data from any suitable source, e.g., from memory 410 (as nonlimiting examples, internal storage, an internal database, etc.), from external (e.g., remote) storage 412 connected locally or over the network 406, etc. Data for new and/or existing data streams may be generated or received by the server 402 and/or client devices 404*a-d* using one or more input and/or output devices, sensors, communication ports, etc.

Example training methods can generate an updated model, including, incorporating, or provided entirely by, a trained dimensionality reduction model represented by a neural network model and parameters, that can be likewise stored in the server (e.g., memory 410), client devices 404*a-d*, external storage 412, or combination. In some example embodiments provided herein, training and/or inference may be performed offline or online (e.g., at run time), in any combination. Training may be a single training, continual, or a combination (e.g., for different models in example systems. Results of training and/or inference can be output (e.g., displayed, transmitted, provided for display, printed, etc.) and/or stored for retrieving and providing on request.

Example trained neural network models can be operated (e.g., during inference or runtime) by processors and memory in the server 402 and/or client devices 404*a-d* to perform one or more tasks. Nonlimiting example tasks include data compression tasks, classification tasks, retrieval tasks, question answering tasks, etc. for various applications such as, but not limited to, computer vision, autonomous movement, and natural language processing. During inference or runtime, for example, a new data input (e.g., representing text, voice, image, sensory, or other data) can be provided to the trained model (e.g., in the field, in a controlled environment, in a laboratory, etc.), and the trained model can process the data input. The processing results can be used in additional, downstream decision making or tasks and/or displayed, transmitted, provided for display, printed, etc.) and/or stored for retrieving and providing on request.

Example Embodiments

Features of example dimensionality reduction model training methods used in experiments will now be described for further illustration. These example methods provide relatively simple, scalable, and general dimensionality reduction. Methods compare a datapoint and Euclidean nearest neighbors to define distortions of the input that the dimensionality reduction function should be invariant to, and to approximate a local manifold geometry. The example redundancy reduction loss used can be based on the loss calculation disclosed in Zbontar, J., Jing, L., Misra, I., LeCun, Y., & Deny, S. (2021, July). Barlow twins: Self-supervised learning via redundancy reduction. In International Conference on Machine Learning (pp. 12310-12320). PMLRJ, which is incorporated in its entirety by reference herein. This redundancy loss is used to learn an encoder that outputs similar representations for neighboring pairs from a training set, while also decorrelating the output dimensions.

Using the example system 100 shown in FIG. 1, for example, given a set of feature vectors in a generic input space, an example dimensionality reduction model training method uses nearest neighbors to define a set of feature pairs whose proximity it is desired to preserve. The dimensionality reduction function embodied in the encoder 102 is then trained by encouraging neighbors in the input space to have similar representations. The projector is an auxiliary projector that produces high dimensional (d') representations, and the similarity preservation and computed redundancy reduction loss, e.g., computed using the method disclosed in J. Zbontar et al., is computed over the d'×d' cross-correlation matrix averaged over the batch b. This loss preserves neighboring relations while minimizing the redundancy of output dimensions.

The nearest neighbor computation can be performed offline, and the learning process can be a relatively straightforward stochastic gradient descent (SGD) learning process. Such example training methods are highly scalable, and can learn linear and non-linear encoders for dimensionality reduction, while easily handling out-of-sample generalization.

Experiments were conducted using example dimensionality reduction training methods for image and document search applications, which are example applications where training labels may be non-existent and where dimensionality reduction is significant. A compact encoder is used in experiments, integrated into first-stage retrieval systems. It was demonstrated that significant gains can be achieved without any change in encoding and search complexity, for instance, by replacing a PCA method with an example encoding method trained according to embodiments herein. Example methods were also shown to be robust to a large range of hyperparameters, as well as variations in the architectures, batch size, and number of neighbors used.

Problem Statement

Starting with a set of high-dimensional features (which may be labeled or unlabeled), a goal is to learn a lower-dimensional space that preserves the local geometry of the larger input space. Assuming no prior knowledge other than the reliability of the local geometry of the input space, nearest neighbors are used to define a set of feature pairs whose geometry (e.g., proximity) it is desired to preserve. The parameters of the dimensionality reduction function (e.g., encoder) are learned using a loss that encourages neighbors in the input space to have similar representations, while also minimizing the redundancy between the components of these vectors. A projector is appended to the encoder to produce a representation in a very high dimensional space, and the loss is computed to minimize similarity preservation loss and redundancy reduction loss, e.g., based on the method disclosed in J. Zbontar et al. The projector can then be discarded for task training.

In absence of prior knowledge, defining local distortions is achieved via assumptions on the input manifold. Assuming a locally linear manifold, for instance, allows one to use the Euclidean distance as a local measure of on-manifold distortion, and using nearest neighbors over the training set provides a good approximation for local neighborhoods of the input space. Accordingly, in some example methods pairs of neighboring training vectors are constructed, and invariance to the distortion from one such vector to another is learned as a proxy to learning to preserve proximity.

The local neighborhood of each point is defined using a hyperparameter k to select the same number of nearest neighbors for each training sample. This was shown in experiments to be sufficient, and robust across a wide range of k. Weighted variants or radius-based variants can be used, though these can increase complexity.

Other experimental methods defined neighborhoods using a simplified variant where pairs were constructed by adding Gaussian noise to the input vector. Experiments showed that even though adding such noise can lead to distortions off the input manifold, such methods can still learn meaningful embedding.

Notation: The goal is to learn an encoder $f_\theta:\mathbb{R}^D\rightarrow\mathbb{R}^d$ that takes as input a vector $x\in\mathbb{R}^D$ and outputs a corresponding reduced vector $z=f_\theta(x)\in\mathbb{R}^D$, with d<<D. In this example, the encoder is defined to be a neural network with learnable parameters θ. Let $\chi$ be a (training) set of datapoints (for instance, high-dimensional vectors) in $\mathbb{R}^D$, the D-dimensional input space. Let $x\in\mathbb{R}^D$ be a vector from $\chi$. $\mathcal{N}_k(x)$ is composed of the k nearest neighbors of x, where k can be a hyperparameter. For a vector $y\in\chi$ from the training set: $y\in\mathcal{N}_k(x)\Leftrightarrow y\in \arg_k{}^{min}{}_{y\in\chi} d(x, y)$, where d(•,•) denotes the Euclidean distance. This definition can be easily extended to non-Euclidean distances and adaptive neighborhoods (e.g., defined by a radius). Using pairs from k Euclidean neighbors, neighbor pairs or positive pairs are defined as pairs $(x, y)\in\chi\times\chi$ where $y\in\mathcal{N}_k(x)$.

As mentioned above, it is highly desirable to minimize the redundancy of the output dimension for dimensionality reduction, as having a highly informative output space is more useful than a highly discriminative one. In example methods, the parameters were learned by minimizing the loss function disclosed in J. Zbontar et al.

For training, a projector $g_\phi$ (defined by parameters ϕ) is appended to the encoder $f_\theta$, allowing calculation of the loss in a third, higher dimensional representation space, though this space is not used for subsequent tasks. This extended space can be much larger. Let $\hat{z}=g_\phi(f_\theta)$ (or $\hat{z}=g_\phi(f_\theta(x))$) be the output vector of the projector, where $\hat{z}\in\mathbb{R}^{d'}$. Given a pair of neighbors $(x^A, x^B)$ and the corresponding vectors $\hat{z}^A$, $\hat{z}^B$ after the projector, the loss function $\mathcal{L}_{BT}$ is given by:

$$\mathcal{L}_{BT}=\sum_i\left(1-\mathcal{C}_{ii}\right)^2+\lambda\sum_i\sum_{i\neq j}\mathcal{C}_{ij}^2,\text{ where} \tag{1}$$

$$\mathcal{C}_{ij}=\frac{\sum_b \hat{z}^A_{b,i}\hat{z}^B_{b,j}}{\sqrt{\sum_b\left(\hat{z}^A_{b,i}\right)^2}\sqrt{\sum_b\left(\hat{z}^B_{b,j}\right)^2}},$$

Where b indexes the positive pairs in a batch, i and j are two dimensions from $\mathbb{R}^{d'}$ (i.e., 0≤i, j≤d'), and λ is a hyperparameter. $\mathcal{C}$ is the d'×d' cross-correlation matrix computed and averaged over all positive pairs $(\hat{z}^A, \hat{z}^B)$ from the current batch.

The loss is composed of two terms. The first term encourages the diagonal elements to be equal to 1. This makes the learned representations invariant to applied distortions, that is, the datapoints moving along the input manifold in the neighborhood of a training vector are encouraged to share similar representations in the output space. The second term pushes off-diagonal elements towards zero, reducing the redundancy between output dimensions, which is highly desirable for dimensionality reduction. The loss can be used to learn the parameters θ of the encoder $f_\theta$ and the parameters ϕ of the projector $g_\phi$.

Different architectures for the encoder $f_\theta$ were considered:

Linear: A straight-forward encoder $f_\theta$ is a linear function parameterized by a D×d weight matrix W and bias term b; i.e., $f_\theta(x)=Wx+b$. Beyond computational benefits, and to provide medium-sized output spaces where d e {8 . . . , 512}, given a meaningful enough input space a linear encoder can sufficiently preserve neighborhoods of the input.

Factorized linear: Exploiting the fact that batch normalization (BN) is linear during inference (as it reduces to a linear scaling applied to the features that can be embedded in the weights of an adjacent linear layer), $f_\theta$ is alternatively formulated as a multi-layer linear model, where $f_\theta$ is a sequence of l layers, each composed of a linear layer followed by a BN layer. This example model introduces non-linear dynamics that can help during training. The sequence of l layers can be replaced with a single layer after training for efficiently encoding new features.

Multilayer Perceptron (MLP): $f_\theta$ can also be a multilayer perceptron with batch normalization and rectified linear units (reLUs) as non-linearities, such that $f_\theta$ is a sequence of l linear-BN-reLU triplets, each with $H^i$, i=1, . . . l hidden units, followed by a linear projection from $H^l$ to d dimensions.

The example projector can be implemented as an MLP inserted between the transferable representations (the encoder output) and the loss function, such as the location of the projector 120 in FIG. 1. Example methods operate in large output dimensions, e.g., d'>>d, and experiments showed that calculating the de-correlation loss in higher dimensions is beneficial. Thus, in example methods, the transferable representation can be the bottleneck of the non-symmetrical hourglass training system 100 shown in FIG. 1. Although the loss calculated in Equation (1) is applied after the projector, and so only indirectly decorrelates the output representations component (before the projector), providing more dimensions to decorrelate leads to a bottleneck representation that is more informative, allowing the network to learn an encoder that also has more decorrelated outputs.

An example pseudocode for performing an example method is shown in FIG. 5. Example hyperparameters include batch size and number of neighbors. The k nearest neighbors of each vector in a training set of M D—dimensional vectors is calculated, and batches are randomly sampled. An encoder and a decoder are initialized, and a matrix of size M×k is computed. During training, the loss is calculated as described above, and parameters of the encoder and decoder are updated. After training, the projector can be discarded, and a model can be returned.

Experiments

Experiments were conducted to validate example methods both on visual and textual features. Although these features are typically learned during a pre-training stage, it was assumed that input representations were given as is (without the computational power nor the data to fine-tune them). Consequently, example methods operated only after the core representation learning process, and independently from the nature of the representation.

Input representation spaces and tasks were selected for various modalities, summarized in FIG. 6. Tasks were explored including landmark image retrieval on ROxford and RParis datasets, object class retrieval on ImageNet, and argument retrieval on the ArguAna dataset (Wachsmuth et al., Retrieval of the best counterargument without prior topic knowledge. In Proceedings of the Annual Meeting of the Association for Computational Linguistics, pp. 241-251, 2018). All experiments started with reliable feature vectors, which was useful for dimensionality reduction. It was assumed that any structured data (images, documents) was first encoded with a suitable representation. For the experiments, it was also assumed that the Euclidean distance was meaningful, at least locally, in the input representation space(s).

Example training methods were evaluated on example landmark image retrieval tasks on the ROxford and RParis datasets and k-NN retrieval on ImageNet. Experiments started from both specialized, retrieval-oriented representations such as GeM-AP (Revaud et al., Learning with average precision: Training image retrieval with a listwise loss, In International Conference on Computer Vision, 2019), and more generic representations learned via self-supervised learning such as DINO. For the experiments, the DINO and GeM-AP models were used as feature extractors to encode images for visual tasks. Global image features were used form publicly available models for GeM-AP or DINO. For the textual domain, there was a focus on the task of argument retrieval. 768-dimensional features were used from an off-the-shelf Bert-Siamese model called ANCE (Xiong et al., Approximate nearest neighbor negative contrastive learning for dense text retrieval, In International Conference on Learning Representations, 2021) trained for document retrieval, following the dataset definitions from a recent benchmark. Supervision was not used for learning experimental methods (TLDR) nor the comparative methods. Given a trained dimensionality reduction encoder, all downstream task data was encoded for each test dataset, and they were evaluated in a "zero-shot" manner, using non-parametric classifiers (k-NN) for all retrieval tasks. For landmark image retrieval on ROxford/RParis common protocols were used as provided in Radenovic et al., Revisiting Oxford and Paris: Large-scale image retrieval benchmarking. In IEEE Conference on Computer Vision and Pattern Recognition, pp. 5706-5715, 2018, where specific queries are defined. For every query, the mean average precision metric was measured across all other images depicting the same landmark. For ImageNet, e.g., as provided in Russakovsky et al., Imagenet large scale visual recognition challenge, International Journal of Computer Vision, 115(3):211-252, 2015, the process followed by Caron et al., Emerging properties in self-supervised vision transformers. In International Conference on Computer Vision, 2021, was used: the gallery was composed of the full validation set, spanning 1000 classes, and each image from this validation (val) set was used in turn as a query. Again, k-NN was used to compute a list of images ranked by their relevance to the query, and the labels were aggregated from the top 20 images, assigning the predicted query label to the most prominent class. Results are shown in FIG. 6. For the visual (resp. textual) domains d=128 (resp. d=64) were selected as the most commonly used setting in practice.

Example learning methods did not explicitly normalize representations, but they did L2-normalize the features before retrieval for both tasks. Results reported for PCA use whitened PCA; multiple whitening power values were tested, and the ones that performed best were kept. Example methods successfully used the same hyper-parameters for the learning rate, weight decay, scaling, and 2 suggested by Zbontar et al, despite the fact that the tasks and encoders are quite different. PCA was run on up to millions of data points and hundreds of dimensions using out-of-the-box tools, using the PCA implementation from scikit-learn. For large matrices (>500×500) the implementation used the randomized SVD approach disclosed in Halko et al., 2011, which is an approximation of the full SVD, which has been a standard way of scaling PCA to large matrices.

As example methods may have some stochasticity, e.g., from SGD or from neighbor pair sampling, to properly measure variance each variant of experimental methods was run five times and the output results were averaged. Error bars show standard deviation across these five runs.

Landmark image retrieval: For large-scale experiments on this task, it is common practice to apply dimensionality reduction to global normalized image representations using PCA with whitening. Example methods started from GeM-AP and simply replaced PCA with the example training method. 2048-dimensional features were obtained from the pre-trained ResNet-50, which uses Generalized-Mean pooling and has been specifically trained for landmark retrieval using the AP loss (GeM-AP). To learn the dimensionality reduction function, a dataset composed of 1.5 million landmark images was used. The example methods learned different output spaces whose dimensions range from 32 to 512. Finally, these spaces were evaluated on two standard image retrieval benchmarks, the revisited Oxford and Paris datasets ROxford5K and RParis6K. Each dataset came with two test sets of increasing difficulty, the 'Medium' and 'Hard' sets. Following these datasets' protocol, experiments applied the learned dimensionality reduction function to encode both the gallery images and the set of query images whose 2048-dim features have been extracted beforehand. Landmark image retrieval was then evaluated on ROxford5K and RParis6K, for each test set, and the mean average precision (mAP), a standard metric for these datasets, was reported.

In the results, TLDR used a linear projector, TLDR, used a factorized linear one, and $TLDR_1$* used an MLP encoder with 1 hidden layer. As an alternative, $TLDR_G$ was also used, which did not compute nearest neighbors, but used Gaussian noise to create synthetic neighbors. All experimental methods used an MLP with 2 hidden layers and 8192 dimensions for each of these layers as a projector.

Results were compared with a number of unsupervised and self-supervised (neighbor-supervised) methods, reported in Table 1. For unsupervised methods, an objective is based on reconstruction, while neighbor-supervised methods use nearest neighbors as pseudo-labels to guide the learning. Denoising learns to ignore added Gaussian noise.

A first comparison was to methods reducing the dimension with PCA with whitening, a standard practice for these datasets. Then, learning PCA can be rewritten as learning a linear encoder and projector with a reconstruction loss. For comparison, results for example methods were reported trained with the Mean Square Error reconstruction loss, referred to as MSE, instead of using the loss disclosed in J. Zbontar et al. In this case, the projector's output was reduced to 2048 dimensions in order to match the input's dimensionality.

TABLE 1

| Method | (Self-) supervision | Encoder | Projector | Loss | Notes |
|---|---|---|---|---|---|
| PCA | Unsupervised | Linear | Linear | Reconstruction MSE + orthogonality | |
| DrLim | Neighbor-supervised | MLP | None | Contrastive | No projector (very low performance) |

TABLE 1-continued

| Method | (Self-) supervision | Encoder | Projector | Loss | Notes |
|---|---|---|---|---|---|
| DrLim: Contrastive | Neighbor-supervised | Linear | MLP | Contrastive | DrLim With projector |
| MSE | Unsupervised | Linear | MLP | Reconstructive MSE | TLDR with MSE loss |
| $TLDR_G$ | Denoising | Linear | MLP | Barlow Twins (J. Zbontar et al.) | TLDR with noise as distortion |
| TLDR | Neighbor-supervised | Linear | MLP | Barlow Twins | |
| $TLDR_{1,2}$ | Neighbor-supervised | Fact. Linear | MLP | Barlow Twins | |
| $TLDR^*_{1,2}$ | Neighbor-supervised | MLP | MLP | Barlow Twins | |

Another experimental approach, a contrastive approach, used a contrastive loss on top of the projector's output. This shared some features with methods disclosed in R. Hadsell et al., Dimensionality reduction by learning an invariant mapping, In Proc. CVPR, volume 2, 2006, but in example methods only the loss was changed, and replaced with a standard contrastive one.

For comparison, retrieval results were also obtained on the initial features from J. Revaud et al., Learning with average precision: Training image retrieval with a listwise loss, In Proc. ICCV, 2019, i.e., without dimensionality reduction. Although all experimental methods fixed the number of nearest neighbors to 3, example methods can perform well for a wide range of number of neighbors.

Results

Figure 7:
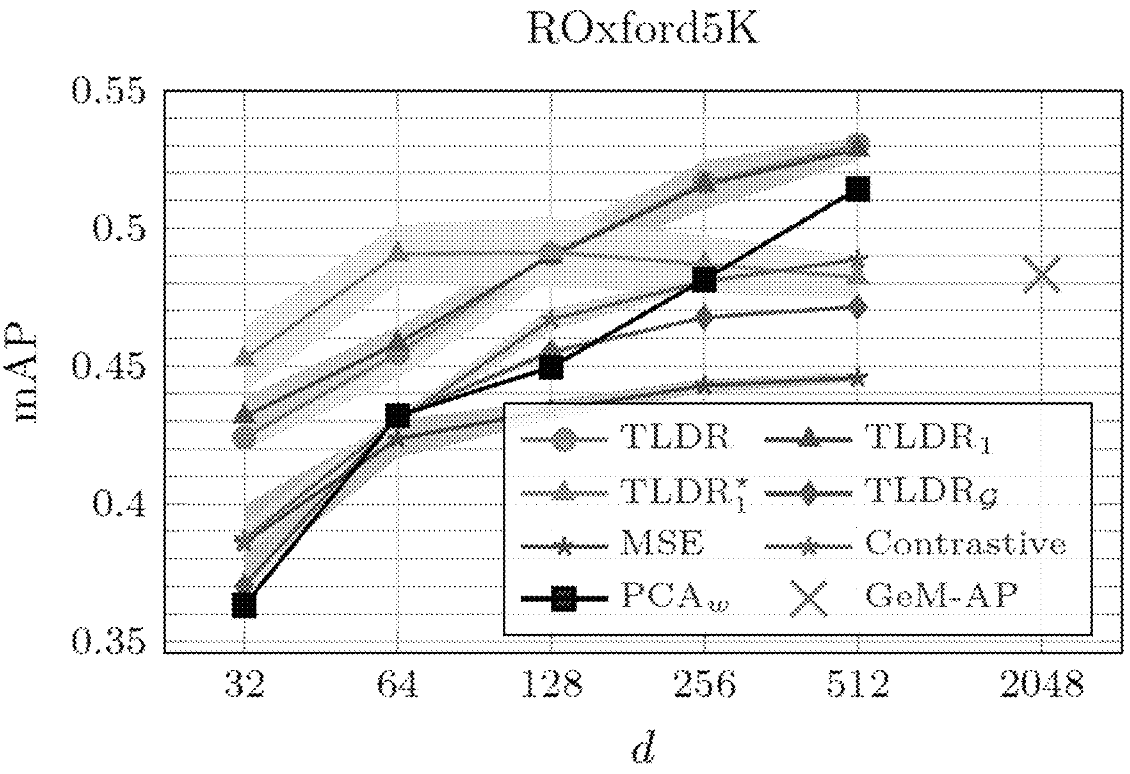
FIGS. 7-8 show mean average precision (mAP) results for ROxford5K and RParis6K, respectively, averaging Medium and Hard protocols, as an output dimension d varies, where an example method, TLDR, was performed with different encoders: linear (TLDR), factorized linear with 1 hidden layer ($TLDR_1$), and an MLP with 1 hidden layer ($TLDR^*_1$), where the projector remains the same (MLP with 2 hidden layers). Also compared were two baselines based on TLDR: one trained with mean squared error (MSE) reconstruction and a contrastive loss, and a variant of TLDR ($TLDR_G$) which uses Gaussian noise to synthesize pairs, as well as two additional baselines: PCA with whitening, and the original 2048-dimensional features (GeM-AP) before projection.
Figure 8:
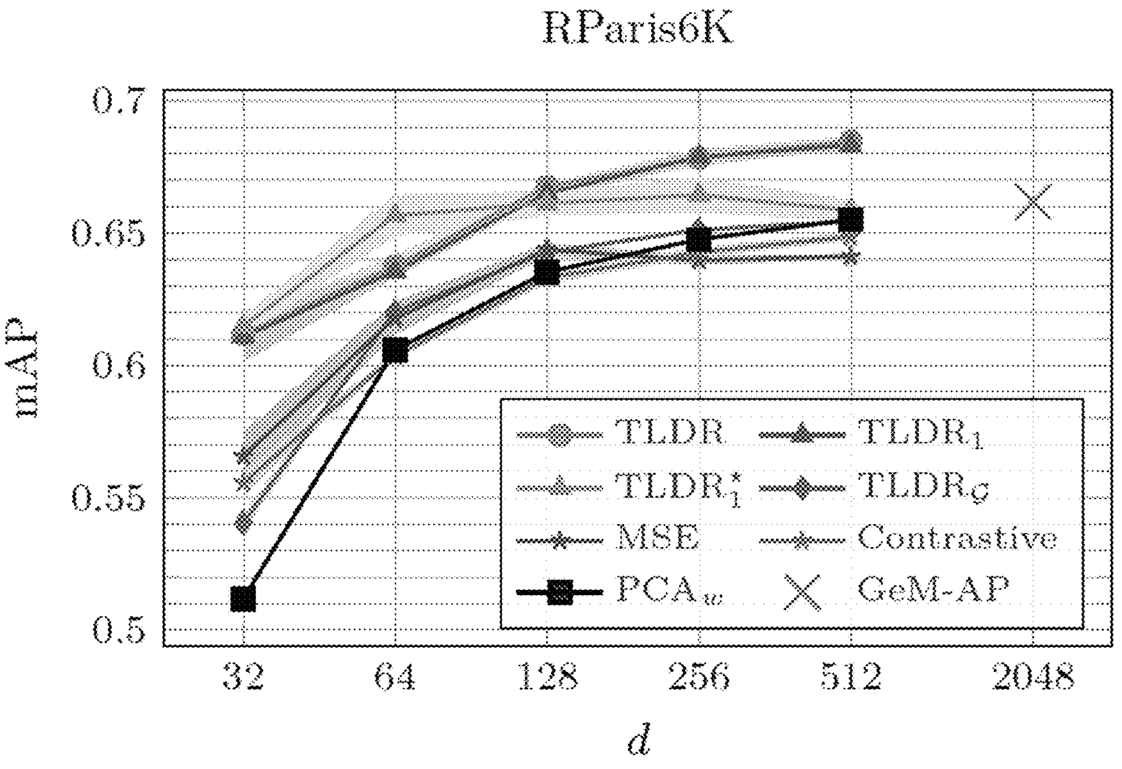

FIGS. 7-8 show mean average precision (mAP) results for ROxford5K and RParis6K, averaging Medium and Hard protocols, as the output dimension d varies. It was observed that both linear versions of example methods outperformed PCA by a significant margin. For instance, TLDR improved ROxford5K retrieval by almost 4 mAP points for 128 dimensions over the PCA baseline. The MLP based method was very competitive for very small dimensions (up to 128) but degraded for larger ones. Further, example methods were able to retain the performance of the input representation GeM-AP, while using only 1/16 of its dimensionality. Using a different loss (MSE and Contrastive) instead of the loss calculated according to Zbontar et al., degraded the results, as did replacing true neighbors by synthetic ones.

DINO Representations: The above experiments started from representations pretrained using supervision and tailored to the landmark retrieval task, and then dimensionality reduction was learned on top of those in an unsupervised way. Additional experiments evaluated a fully unsupervised case and assessed performance of example methods using representations learned in an self-supervised way.

Figure 9:
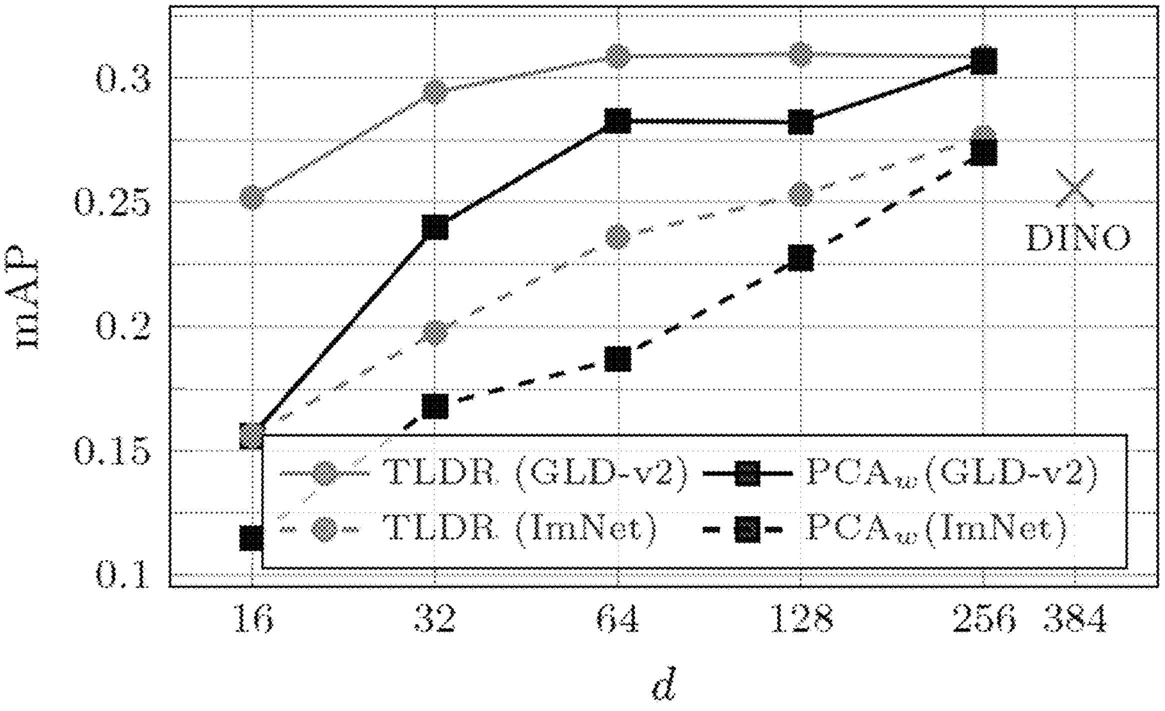
FIGS. 9-10 show self-supervised landmark retrieval performance on ROxford using DINO ViT-S/16 backbones, where
Figure 10:
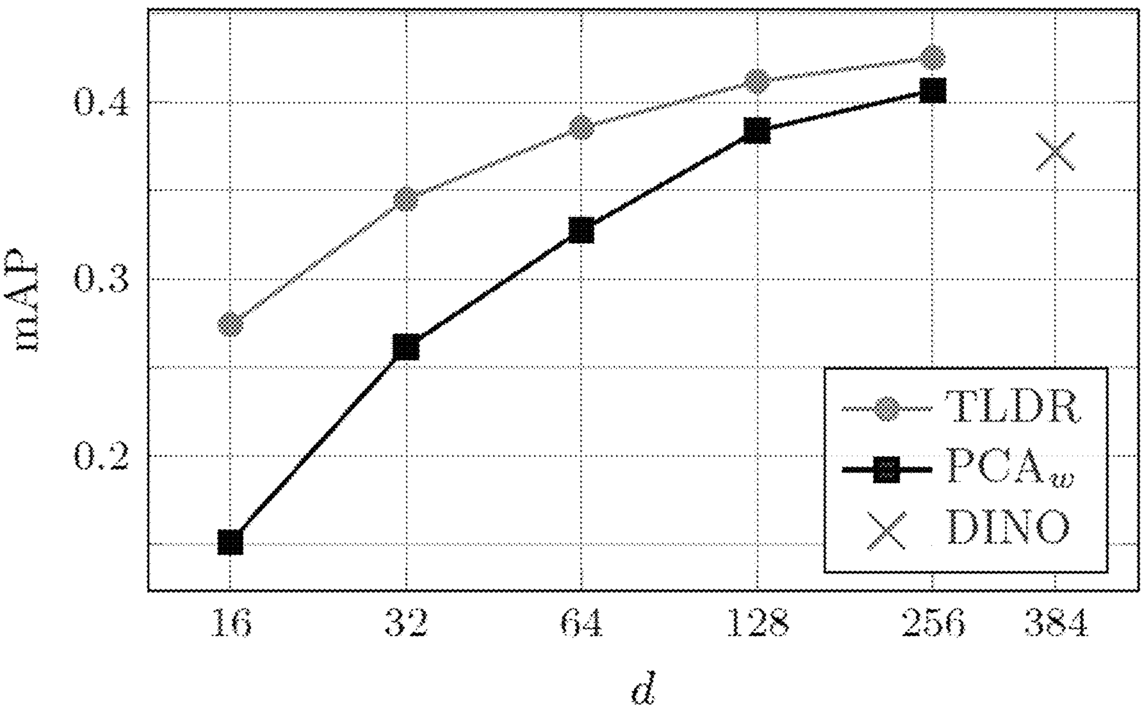

FIGS. 9-10 show results on ROxford when learning dimensionality reduction on top of DINO features from a ViT-S/16 backbone. All cases followed the evaluation protocol provided above.

In FIG. 9 results are shown starting from a publicly available ViT DINO model trained on ImageNet, where similar to the GeM-AP case the ViT was treated as a feature extractor and a linear encoder was learned on top using either the GLD-2 or ImageNet datasets. Both features and dimensionality reduction were learned without any supervision.

It is shown that example methods exhibit strong gains over PCA with whitening, the best performing competing method, and that gains are consistent across multiple values of output dimensions d and across all setups. For example, assuming access to unlabeled data from a downstream landmark domain, one can achieve a large (+5.4) mAP gain over DINO, merely by learning a linear encoder on top, without the need to fine-tune the ViT model. Further, example training methods were able to match the DINO ViT performance on ROxford using only 16 dimensions.

FIG. 10 shows a publicly available DINO model trained in an unsupervised way on GLD-v2. Caron et al., 2021, evaluated their representations on ROxford and RParis using global image features from this model; they reported 37.9% mAP on ROxford for the average setting (0.52/0.24 for medium/hard splits). It is shown that example training methods can improve on that result and are able to achieve improved performance on ROxford when using self-supervised learning: 0.43 mAP (0.57/0.28 for medium/hard splits) for d=256, +4.6% mAP higher than using the original DINO features learned on GLD-v2.

Object Retrieval

Additional experiments evaluated the performance of example training methods on ImageNet retrieval using k-NN. The protocol from Caron et al., 2021, and Wu et al., Unsupervised feature learning via non-parametric instance discrimination. In IEEE Conference on Computer Vision and Pattern Recognition, 2018, was followed, and the corresponding evaluation scripts provided in the DINO codebase were run. Queries were performed with all images in the ImageNet val set, using the training set as the database. Similar to DINO, results were provided using 20-NN.

Figure 11:
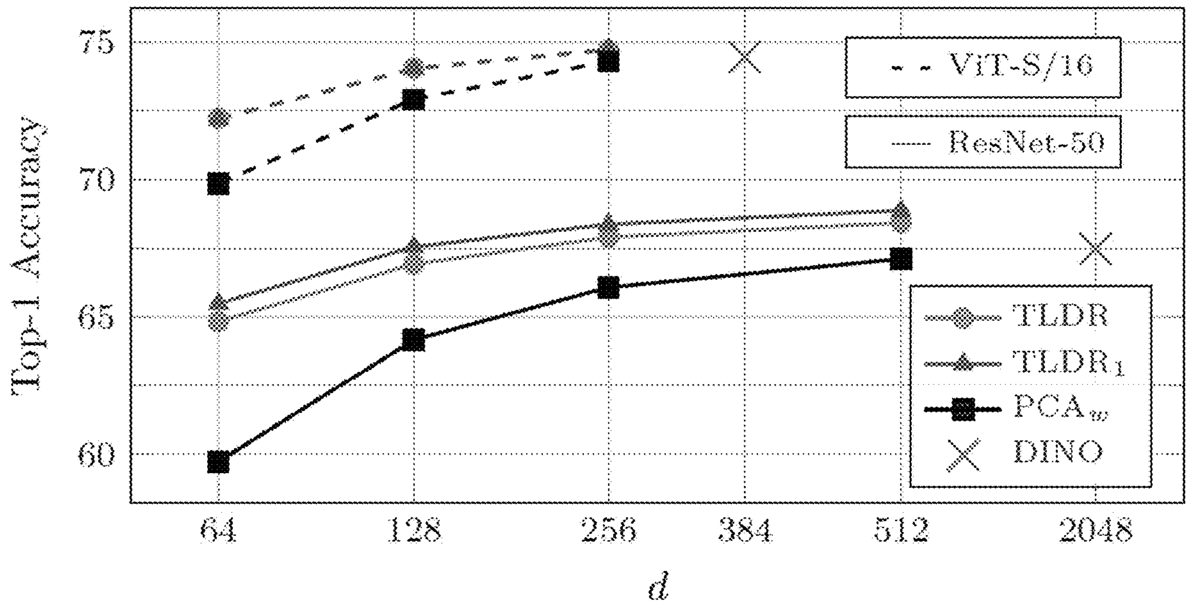
FIGS. 11-12 show retrieval results on ImageNet, and after vector quantization.
Figure 12:
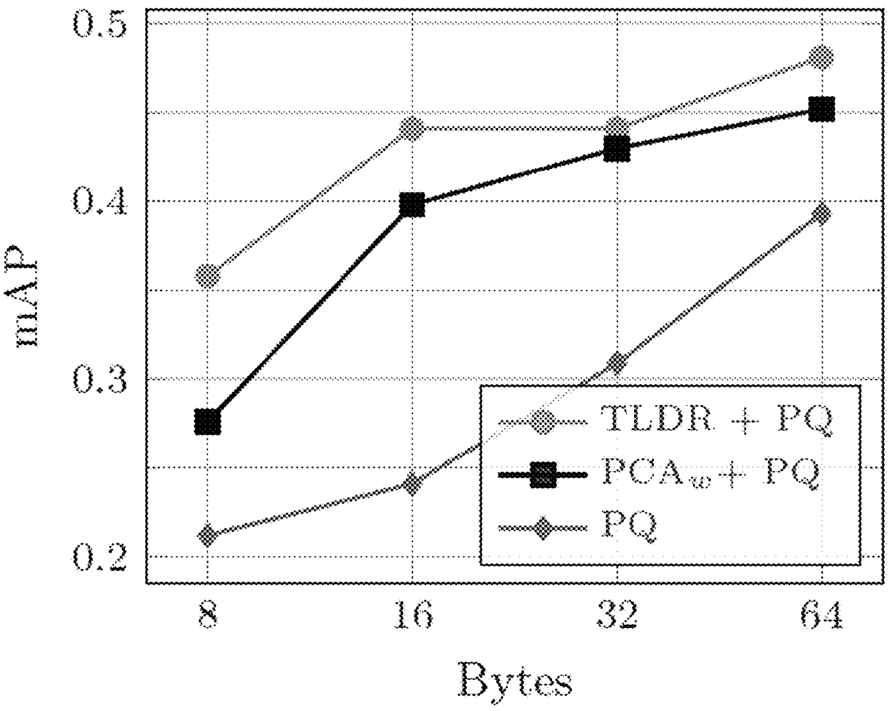

Top-1 accuracy is illustrated in FIG. 11 for the DINO ResNet-50 and ViT-S/16 models, and FIG. 12 shows performance after PQ quantization of the reduced features as a function of the output vector size. Example methods were shown to perform consistently better than PCA in this case as well, and for ResNet-50 example methods provided +9.4/5.1/2.7% gains over PCT for d=32/64/128. For ViT, performance was higher and gains smaller, but still consistent, Generally, example TLDR encoders improved DINO's retrieval performance on ImageNet k-NN for both backbones and for all output dimension over d=128, while PCA did not improve DINO's performance. It was also shown that TLDR was able to outperform the original 2048-dimensional features with only 256 dimensions, thus achieving a 10× compression without loss in performance for ResNet-50, or reaching approximately 75% Top-1 accuracy on ImageNet with 256-dimensional features for ViT-S/16 DINO.

First Stage Document Retrieval

For document retrieval, the process is generally divided into two stages: the first one selects a small set of candidates while the second one re-ranks them. Because it works on a smaller set, this second stage can afford costly strategies, but the first stage has to scale. A typical way to do this is to reduce the dimension of the representations used in the first retrieval stage, often in a supervised fashion. Experiments using example methods investigated the use of unsupervised dimensionality reduction for document retrieval scenarios where a supervised approach is not possible, e.g., when no such training data is available.

768-dimensional features were extracted from a model trained for Question Answering (QA), ANCE, as disclosed in Xiong et al., Approximate nearest neighbor negative contrastive learning for dense text retrieval, In International Conference on Learning Representations, 2021. Experiments used Webis-Touché-2020, a conversational argument dataset composed of 380 k documents to learn the dimensionality reduction function. The test scenario was ArguAna, which is a counter-argument retrieval dataset.

A compilation of datasets was used as provided in N. Thakur et al., BEIR: a heterogeneous benchmark for zero-shot evaluation of information retrieval models, arXiv preprint arXiv:2104.08663, 2021, and the standard evaluation procedure disclosed therein was followed (recall@100 for 1st stage retrieval). To perform early stopping the queries from Webis-Touché-2020 were used, and both datasets did not include training pairs/development queries for supervised learning, only corpuses and test queries. For the test results, 5 different initializations were used and mean and standard deviation were reported.

Various versions of example TLDR methods were evaluated and compared. TLDR used a linear encoder while $TLDR_1$ and $TLDR_2$ used a factorized linear one with respectively one hidden layer and two hidden layers. Comparison was made with PCA, which was the best performing competitor. Retrieval results were obtained with the 768-dimensional initial features.

Figure 13:
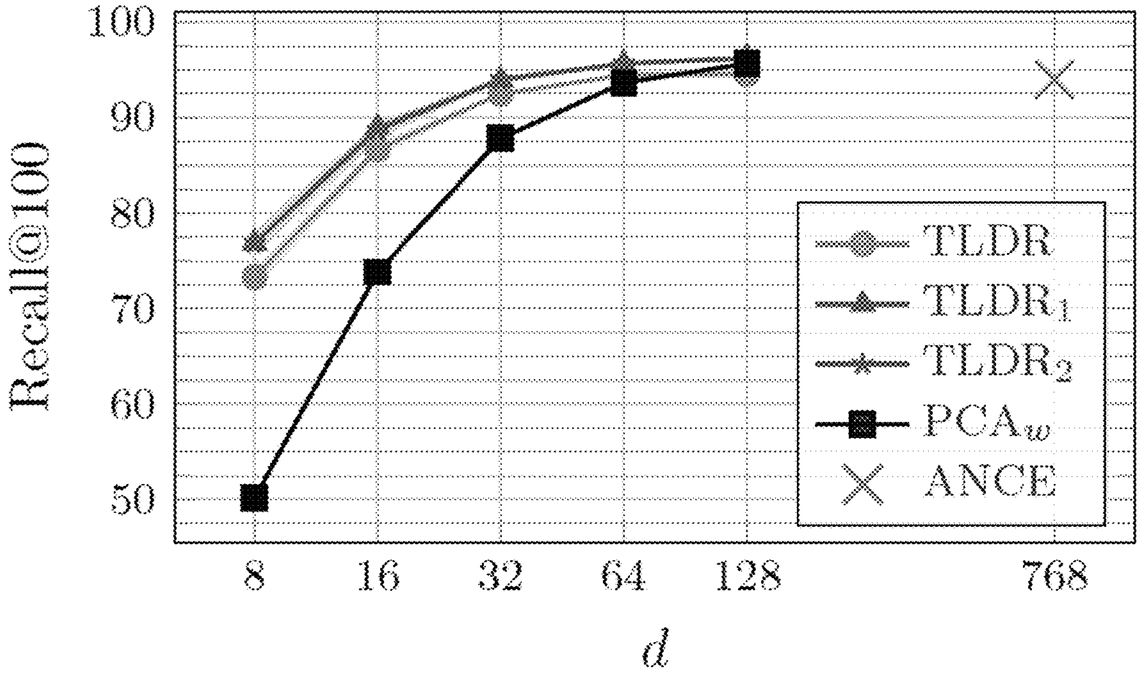
FIGS. 13-14 show example argument retrieval results on ArguAna for different output dimensions d, where in FIG. 13 the amount of factorized layers is varied, with fixed k=3, and in FIG. 14 the amount of factorized layers is fixed to two and k varies k={3, 10, 100}. Factorized linear was fixed to 512 hidden dimensions.
Figure 14:
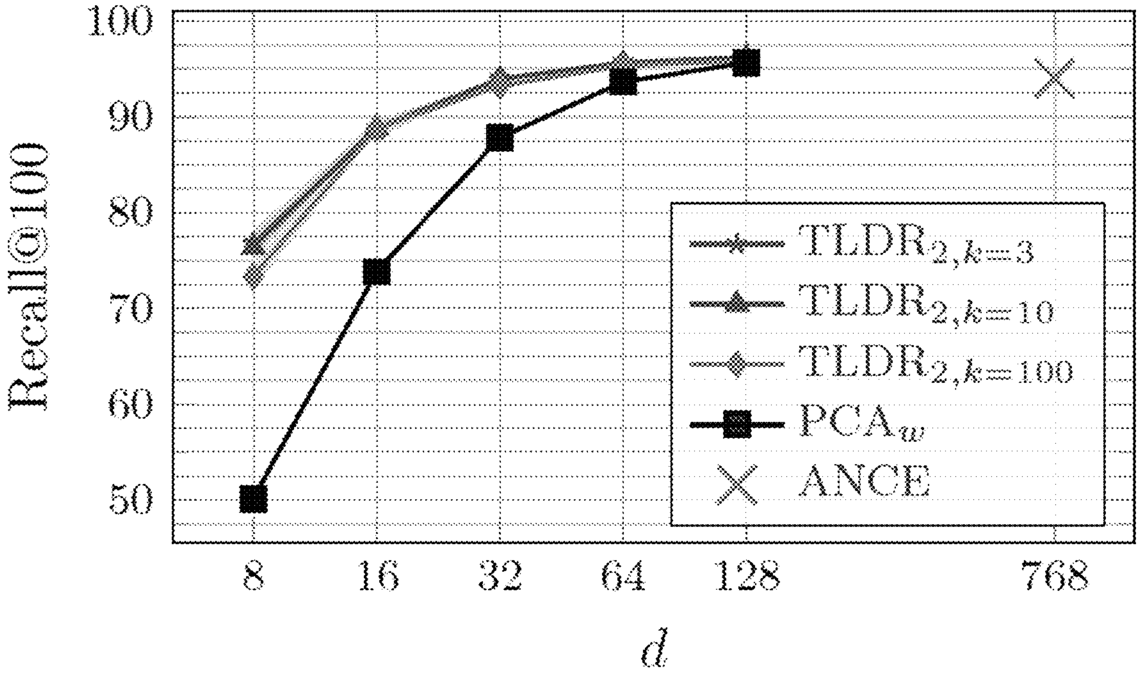

FIGS. 13-14 show retrieval results on ArguAna, for different output dimensions d. It was observed that the linear version of TLDR outperformed PCA for almost all values of d. The linear-factorized ones outperformed PCA in all scenarios. The gain brought by TLDR over PCA increased as d decreased. Equivalent results to the initial ANCE representation were also achieved using only 4% of its dimensions. PCA, on the other hand, needed twice as many dimensions to achieve similar performance. Other example methods were modified by using labels to only keep as pairs neighbors that came from a same landmark in the training set. Results significantly outperformed $ICA_w$, which is on par with PCA.

Example TLDR methods were robust to approximate computation of nearest neighbors, which was demonstrated by using product quantization while varying the quantization budget (the amount of bytes used for each image during the nearest neighbor search). Even for strong quantization (e.g., 1/64 the default size) example TLDR methods achieved equivalent results to not using approximation. Larger training sets may further improve performance of example methods, even in comparison with methods such as PCA.

Figure 15:
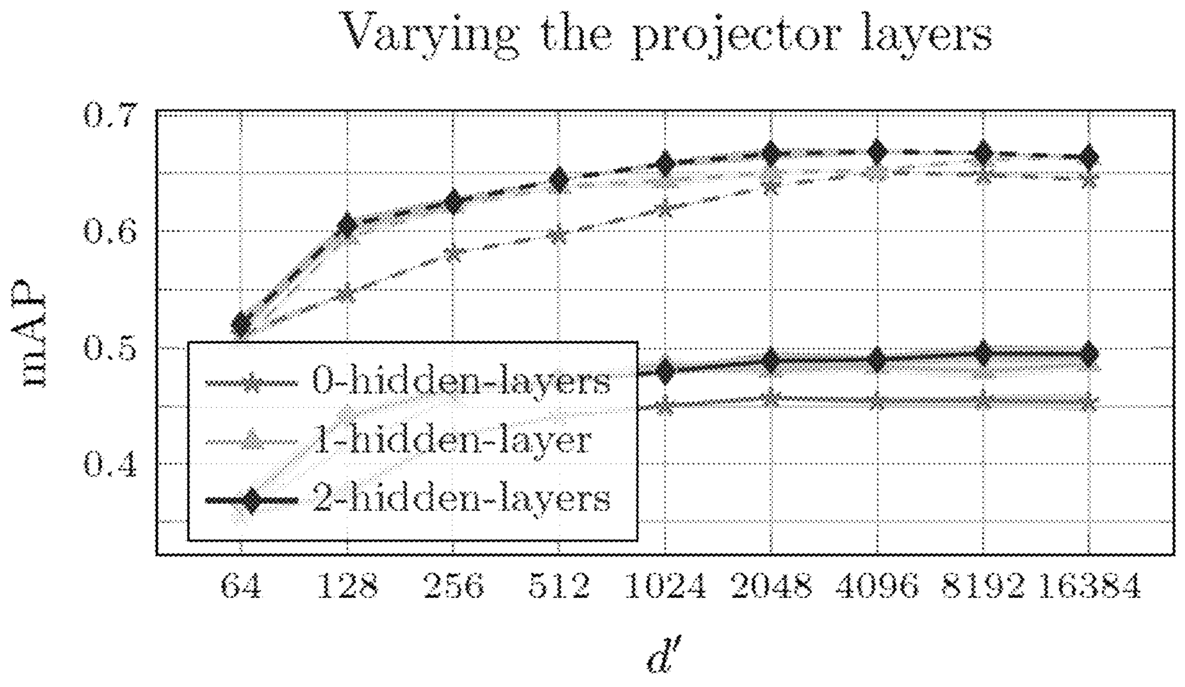
FIGS. 15-16 illustrate effects of varying certain parameters with a linear encoder and d=128 in experiments. Varied parameters include: projector layers (FIG. 15) showing impact of auxiliary dimension d' and number of hidden layers in the projector; and number of neighbors k (FIG. 16). Dashed (solid) lines are for RParis6K-Mean (ROxford5K-Mean).
Figure 16:
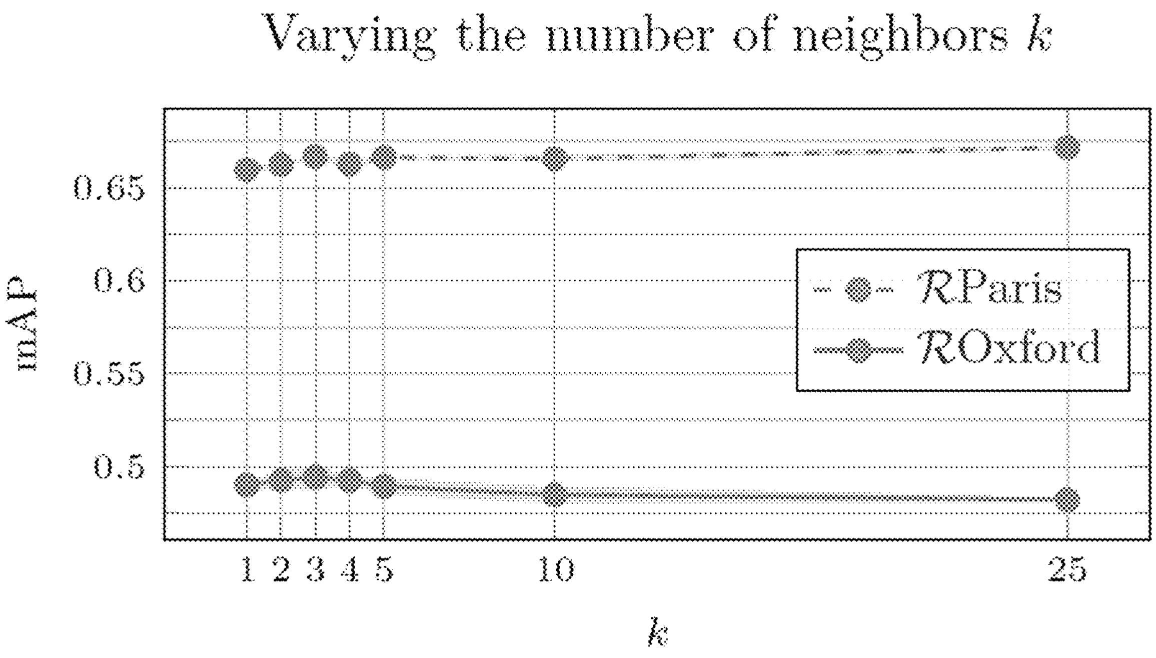

FIGS. 15-16 illustrate effects on example performance from varying certain hyper-parameters. FIG. 15 shows results of experiments varying the architecture of the projector. Having hidden layers generally improved results. Further, having a high auxiliary dimension d' for computing the loss highly impacted performance.

FIG. 16 shows results from varying the number of neighbors k. Performance was surprisingly consistent performance of example methods across a wide range of numbers of neighbors k, as well as across several batch sizes.

Although experiments performed dimensionality reduction and evaluation on datasets designed for the same task (e.g., first stage document retrieval under a task of argument retrieval), it is also possible to extend dimensionality reduction and evaluation to other tasks, such as duplicate query retrieval. In such example methods, dimensionality reduction is possible not only for the same task but can be transferred. This can apply even if, for instance, the queries and documents in datasets belong to different domains or have asymmetric retrieval. Various combinations of datasets, including counter-argument retrieval datasets, argument retrieval datasets, and duplicate question retrieval datasets from different forums were used in experiments for training and testing. Example methods performed better against PCA for lower dimensions. Further, the best encoding method (linear or factorized linear) depended on the length of queries and documents of the original data set (factorized linear was better for more equal lengths, while linear was better for less equal lengths).

It is also possible to learn the dimensionality reduction together with the main representation encoder end-to-end, or independently. Learning the dimensionality reduction independently may be desirable if, for instance, changing or fine-tuning the encoder is undesirable or time-consuming, or to reduce computation for future operations where complexity is tied to the dimensionality (e.g., quantization, indexing). Reducing dimensionality also allows for large savings in memory and can speed up query time. Independent learning of dimensionality reduction is also useful for visualization tasks, such as where the output space may be 2-3 dimensional (e.g., learning directly from raw pixel data). Learning the reduction together with the main representation, on the other hand, may be useful if, in the case of specific domains, prior knowledge of the input space can be exploited (e.g., data augmentations for images or masked language modeling of text).

Some example methods can be useful for dimensionality reduction to mid-size outputs, e.g., when d is between 32 and 256 dimensions, a range to which the vast majority of manifold learning methods cannot scale. This can be useful for retrieval, as a nonlimiting example. Example methods further can provide a computationally efficient way of adapting pre-trained representations, e.g., from large pre-trained models, to a new domain or a new task, without the need for any labeled data from the downstream task, and without fine-tuning large encoders.

Example methods can combine neighborhood embedding learning with effective, yet easy to implement self-supervised learning losses. Example methods are scalable. As a nonlimiting example, by learning via stochastic gradient descent, example methods can easily be parallelized across processors including but not limited to graphical processing units (GPUs) and other machines, while for even large datasets, approximate nearest neighbor methods can be used to create input pairs in sub-linear complexity. Example methods are robust to many hyperparameters, such as but not limited to learning rate, weight decay, scaling, offset/weight, batch size, number of nearest neighbors, etc. Example loss objectives can be robust and easy to optimize yet provide non-trivial solutions. Example training methods can provide effective ways of not only compressing representations, but also improving performance of existing models that incorporate or rely on such representations. Additionally, unlike other methods, example methods can provide out-of-sample generalization, in that passing any vector in the training set through the learned dimensionality reduction function will reduce the input features. Further, as encoding using example methods can amount to a simple linear operation, such encoding can be used, for instance, as a direct replacement to encoding methods such as PCA in various tasks and environments.

General

Embodiments of the present invention provide, among other things, a method performed by a processor and memory for training a dimensionality reduction model, the dimensionality reduction model receiving an input vector in a D-dimensional representation space and generating an output vector in a d-dimensional representation space, where D is greater than d, the dimensionality reduction model being defined by one or more trainable parameters, the method comprising: generating a batch of b positive pairs of training vectors in the D-dimensional space, each positive pair including a first training vector and a second training vector, wherein said generating comprises, for each positive pair: selecting the first training vector from a set of training vectors in the D-dimensional representation space; and identifying (e.g., by generating or selecting) a second training vector in the D-dimensional space that is proximate to the first training vector; generating a batch of b lower dimension vector pairs by encoding the first and second training vectors in each of the batch of b positive pairs to the d-dimensional representation space using the dimensionality reduction model to provide first and second lower dimension vectors, respectively; generating a batch of b augmented dimension vector pairs by projecting the first and second lower dimension vectors in each of the batch of b lower dimension vector pairs to an augmented dimensional representation space having dimension d' to provide first and second augmented dimension vectors respectively, where d' is greater than d; computing a similarity preservation loss and a redundancy reduction loss between the first and second augmented dimension vectors over the batch of b augmented dimension vector pairs; and optimizing the parameters of the dimensionality reduction model to minimize a total loss based on the computed similarity preservation loss and the computed redundancy reduction loss. In addition to any of the above features in this paragraph, identifying the second training vector in each of the batch of b positive pairs may comprise generating a synthetic training vector by adding noise to the first training vector. In addition to any of the above features in this paragraph, generating or selective the second training vector in each of the batch of b positive pairs may comprise selecting a training vector that is proximate to the first training vector from the set of training vectors. In addition to any of the above features in this paragraph, identifying the second training vector in each of the batch of b positive pairs may comprise: determining a set of k nearest neighbors to the first training vector with respect to a metric to provide a neighborhood of the selected training vector; and selecting the second training vector from the determined set of k nearest neighbors, where k is a selectable parameter. In addition to any of the above features in this paragraph, selecting the second training vector may comprise sampling the determined set of k nearest neighbors. In addition to any of the above features in this paragraph, the metric may comprise a Euclidean distance between training vectors. In addition to any of the above features in this paragraph, the metric may comprise non-Euclidean distance between training vectors. In addition to any of the above features in this paragraph, the metric may comprise a radius around each of the training vectors. In addition to any of the above features in this paragraph, computing a similarity preservation loss may comprise computing a cross-correlation between the first and second augmented dimensional vectors over the batch of b augmented dimension vector pairs for common dimensions. In addition to any of the above features in this paragraph, computing a redundancy reduction loss may comprise computing a correlation between dimensions in the first and second augmented dimension vectors over the batch of b augmented dimension vector pairs. In addition to any of the above features in this paragraph, computing a redundancy reduction loss may comprise computing a cross-correlation between the first and second augmented vectors over the batch of b augmented dimensional vector pairs for dimensions other than the common dimensions. In addition to any of the above features in this paragraph, computing a similarity preservation loss and said computing a redundancy reduction loss may comprise computing a d'×d' cross-correlation matrix between the first and second augmented vectors over the batch of b augmented dimension vector pairs. In addition to any of the above features in this paragraph, the total loss is based on the computing a similarity preservation loss and a redundancy reduction loss, weighted by an offset parameter. In addition to any of the above features in this paragraph, the dimensionality reduction function is embodied in a parameterized neural network. In addition to any of the above features in this paragraph, the dimensionality reduction function may comprise a linear function. In addition to any of the above features in this paragraph, the dimensionality reduction function may comprise a non-linear function. In addition to any of the above features in this paragraph, the dimensionality reduction function may comprise a factorized linear function. In addition to any of the above features in this paragraph, the dimensionality reduction function may comprise linear and non-linear functions. In addition to any of the above features in this paragraph, the dimensionality reduction function may be embodied in a parameterized neural network; and the dimensionality reduction function may comprise a multi-layer perceptron having hidden units and a linear projection unit. In addition to any of the above features in this paragraph, the parameterized neural network may further comprise batch normalization. In addition to any of the above features in this paragraph, projecting may use a multi-layer perceptron. In addition to any of the above features in this paragraph, projecting may use a linear projector. In addition to any of the above features in this paragraph, projecting may use a non-linear projector. In addition to any of the above features in this paragraph, optimizing the parameters may use stochastic gradient descent. In addition to any of the above features in this paragraph, the method may be unsupervised. In addition to any of the above features in this paragraph, the method may be self-supervised or neighbor-supervised. In addition to any of the above features in this paragraph, each training vector in the set of training vectors may represent one or more of a token, a sentence, a paragraph, a document, an image, a patch or arbitrary region of an image, a video, a waveform, a 3D model, a 3D point cloud, or embeddings of tabular data. In addition to any of the above features in this paragraph, each training vector in the set of training vectors in the D-dimensional space may comprise a core representation of a feature set. In addition to any of the above features in this paragraph, the core representation is generated offline. In addition to any of the above features in this paragraph, the method may further comprise: storing the optimized parameters.

Additional embodiments of the present invention provide, among other things, a method for encoding an input vector using a processor and memory, the method comprising: inputting the input vector to a dimensionality reduction model trained to receive the input vector in a D-dimensional representation space and generate an output vector in a d-dimensional representation space, where D is greater than d, the dimensionality reduction model being defined by one or more trainable parameters, the dimensionality reduction model being trained by a method comprising: generating a batch of b positive pairs of training vectors in the D-dimensional space, each positive pair including a first training vector and a second training vector, wherein said generating comprises, for each positive pair: selecting the first training vector from a set of training vectors in the D-dimensional representation space; and identifying (e.g., by generating or selecting) a second training vector in the D-dimensional space that is proximate to the first training vector; generating a batch of b lower dimension vector pairs by encoding the first and second training vectors in each of the batch of b positive pairs to the d-dimensional representation space using the dimensionality reduction model to provide first and second lower dimension vectors, respectively; generating a batch of b augmented dimension vector pairs by projecting the first and second lower dimension vectors in each of the batch of b lower dimension vector pairs to an augmented dimensional representation space having dimension d' to provide first and second augmented dimension vectors respectively, where d' is greater than d; computing a similarity preservation loss and a redundancy reduction loss between the first and second augmented dimension vectors over the batch of b augmented dimension vector pairs; and optimizing the parameters of the dimensionality reduction model to minimize a total loss based on the computed similarity preservation loss and the computed redundancy reduction loss; encoding the input vector using the trained dimensionality reduction model to generate an encoded output vector in the d-dimensional space; and outputting the encoded output vector. In addition to any of the above features in the preceding paragraph, dimensionality reduction model comprises a neural network. In addition to any of the above features in the preceding paragraph, the method may further comprise: generating a core representation of an input in the D-dimensional space. In addition to any of the above features in the preceding paragraph, the method may further comprise: normalizing the core representation of the input. In addition to any of the above features in the preceding paragraph, the input may represent one or more of a token, a document, a sentence, a paragraph, an image, a video, a waveform, a 3D model, a 3D point cloud, or embeddings of tabular data. The method of claim 31, wherein the method may further comprise: processing the encoded output vector downstream of the dimensionality reduction model to perform a task. The method of claim 36, wherein the task may comprise a data retrieval task. In addition to any of the above features in the preceding paragraph, the data retrieval task may be over a high-dimensional vector space. In addition to any of the above features in the preceding paragraph, the data retrieval task may use Euclidean metrics. In addition to any of the above features in the preceding paragraph, the data retrieval tasks may use non-Euclidean metrics. In addition to any of the above features in the preceding paragraph, the task may comprise an image retrieval task or a document retrieval task. In addition to any of the above features in the preceding paragraph, generating a batch of b augmented dimension vector pairs may use a projector; and wherein the trained dimensionality reduction model after being trained may omit (not include) the projector. In addition to any of the above features in the preceding paragraph, the dimensionality reduction model during training may use a linear encoder and a non-linear encoder; and wherein the trained dimensionality reduction model after being trained may omit (not use) a non-linear encoder.

Additional embodiments of the present invention provide, among other things, a method for training a neural network model, the neural network model comprising an encoder and a task-performing model downstream of the encoder, the method comprising: providing a training set of input vectors and associated labels; inputting the input vectors to the encoder, wherein the encoder comprises a dimensionality reduction model that receives an input vector in a D-dimensional representation space and generates an output vector in a d-dimensional representation space, where D is greater than d, the dimensionality reduction model being defined by one or more trainable parameters, the dimensionality reduction model being trained by a method comprising: generating a batch of b positive pairs of training vectors in the D-dimensional space, each positive pair including a first training vector and a second training vector, wherein said generating comprises, for each positive pair: selecting the first training vector from a set of training vectors in the D-dimensional representation space; and identifying a second training vector in the D-dimensional space that is proximate to the first training vector (and may share the label with the first training vector); generating a batch of b lower dimension vector pairs by encoding the first and second training vectors in each of the batch of b positive pairs to the d-dimensional representation space using the dimensionality reduction model to provide first and second lower dimension vectors, respectively; generating a batch of b augmented dimension vector pairs by projecting the first and second lower dimension vectors in each of the batch of b lower dimension vector pairs to an augmented dimensional representation space having dimension d' to provide first and second augmented dimension vectors respectively, where d' is greater than d; computing a similarity preservation loss and a redundancy reduction loss between the first and second augmented dimension vectors over the batch of b augmented dimension vector pairs; and optimizing the parameters of the dimensionality reduction model to minimize a total loss based on the computed similarity preservation loss and the computed redundancy reduction loss; encoding the input vectors using the trained dimensionality reduction model to generate encoded output vectors; and training the task-performing model using the encoded output vectors and the input labels. In addition to any of the above features in the preceding paragraph, the dimensionality reduction model may comprise a neural network. In addition to any of the above features in the preceding paragraph, the method may further comprise: generating a core representation of an input for each of the training set of input vectors the in the D-dimensional space. In addition to any of the above features in the preceding paragraph, the method may further comprise: normalizing the core representation of the input. In addition to any of the above features in the preceding paragraph, the training vectors in the training set may represent one or more of a token, a document, an image, an image patch or arbitrary region of an image, a video, a waveform, a 3D model, a 3D point cloud, or embeddings of tabular data.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method performed by a processor and memory for training a dimensionality reduction model, the dimensionality reduction model receiving an input vector in a D-dimensional representation space and generating an output vector in a d-dimensional representation space, where D is greater than d, the dimensionality reduction model being defined by one or more parameters, the method comprising:

- generating a batch of b positive pairs of training vectors in the D-dimensional space, each positive pair including a first training vector and a second training vector, wherein said generating comprises, for each positive pair:
  - selecting the first training vector from a set of training vectors in the D-dimensional representation space; and
  - identifying a second training vector in the D-dimensional space that is proximate to the first training vector;
- generating a batch of b lower dimension vector pairs by encoding the first and second training vectors in each of the batch of b positive pairs to the d-dimensional representation space using the dimensionality reduction model to provide first and second lower dimension vectors, respectively;
- generating a batch of b augmented dimension vector pairs by projecting the first and second lower dimension vectors in each of the batch of b lower dimension vector pairs to an augmented dimensional representation space having dimension d' to provide first and second augmented dimension vectors respectively, where d' is greater than d;
- computing a similarity preservation loss and a redundancy reduction loss between the first and second augmented dimension vectors over the batch of b augmented dimension vector pairs; and
- optimizing the parameters of the dimensionality reduction model to minimize a total loss based on the computed similarity preservation loss and the computed redundancy reduction loss.

2. The method of claim 1, wherein said identifying the second training vector in each of the batch of b positive pairs comprises generating a synthetic training vector by adding noise to the first training vector.

3. The method of claim 1, wherein said identifying the second training vector in each of the batch of b positive pairs comprises selecting a training vector that is proximate to the first training vector from the set of training vectors.

4. The method of claim 3, wherein said identifying the second training vector in each of the batch of b positive pairs comprises:

- determining a set of k nearest neighbors to the first training vector with respect to a metric to provide a neighborhood of the selected training vector; and selecting the second training vector from the determined set of k nearest neighbors, where k is a selectable parameter.

5. The method of claim 4, wherein said selecting the second training vector comprises sampling the determined set of k nearest neighbors.

6. The method of claim 4, wherein the metric comprises a Euclidean distance between training vectors.

7. The method of claim 4, wherein the metric comprises non-Euclidean distance between training vectors.

8. The method of claim 4, wherein the metric comprises a radius around each of the training vectors.

9. The method of claim 1, wherein said computing a similarity preservation loss comprises computing a cross-correlation between the first and second augmented dimensional vectors over the batch of b augmented dimension vector pairs for common dimensions.

10. The method of claim 9, wherein said computing a redundancy reduction loss comprises computing a correlation between dimensions in the first and second augmented dimension vectors over the batch of b augmented dimension vector pairs.

11. The method of claim 9, wherein said computing a redundancy reduction loss comprises computing a cross-correlation between the first and second augmented vectors over the batch of b augmented dimensional vector pairs for dimensions other than the common dimensions.

12. The method of claim 11, wherein said computing a similarity preservation loss and said computing a redundancy reduction loss comprise computing a d'×d' cross-correlation matrix between the first and second augmented vectors over the batch of b augmented dimension vector pairs.

13. The method of claim 1, wherein the total loss is based on computing a similarity preservation loss and a redundancy reduction loss, weighted by an offset parameter.

14. The method of claim 1, wherein the dimensionality reduction function is embodied in a parameterized neural network.

15. The method of claim 1, wherein the dimensionality reduction function comprises a linear function.

16. The method of claim 1, wherein the dimensionality reduction function comprises a non-linear function.

17. The method of claim 1, wherein the dimensionality reduction function comprises a factorized linear function.

18. The method of claim 1, wherein the dimensionality reduction function comprises linear and non-linear functions.

19. The method of claim 1, wherein the dimensionality reduction function is embodied in a parameterized neural network; and wherein the dimensionality reduction function comprises a multi-layer perceptron having hidden units and a linear projection unit.

20. The method of claim 19, wherein the parameterized neural network further comprises batch normalization.

21. The method of claim 1, wherein said projecting uses one or more of a multi-layer perceptron, a linear projector, or a non-linear projector.

22. The method of claim 1, wherein said optimizing the parameters uses stochastic gradient descent.

23. The method of claim 1, wherein the method is unsupervised.

24. The method of claim 1, wherein the method is self-supervised.

25. The method of claim 1, wherein each training vector in the set of training vectors represents one or more of a token, a document, a sentence, a paragraph, a document, an image, a patch or arbitrary region of an image, a video, a waveform, a 3D model, a 3D point cloud, or embeddings of tabular data.

26. The method of claim 1, wherein each training vector in the set of training vectors in the D-dimensional space comprise a core representation of a feature set.

27. The method of claim 26, wherein the core representation is generated offline.

28. The method of claim 1, wherein the method further comprises:

storing the optimized parameters.

29. A method for encoding an input vector using a processor and memory, the method comprising:

inputting the input vector to a dimensionality reduction model that is trained to receive the input vector in a D-dimensional representation space and generate an output vector in a d-dimensional representation space, where D is greater than d, the dimensionality reduction model being defined by one or more trainable parameters;

encoding the input vector using the trained dimensionality reduction model to generate an encoded output vector in the d-dimensional space; and outputting the encoded output vector;

wherein the dimensionality reduction model is trained by a method comprising:

generating a batch of b positive pairs of training vectors in the D-dimensional space, each positive pair including a first training vector and a second training vector, wherein said generating comprises, for each positive pair:

selecting the first training vector from a set of training vectors in the D-dimensional representation space; and identifying a second training vector in the D-dimensional space that is proximate to the first training vector;

generating a batch of b lower dimension vector pairs by encoding the first and second training vectors in each of the batch of b positive pairs to the d-dimensional representation space using the dimensionality reduction model to provide first and second lower dimension vectors, respectively;

generating a batch of b augmented dimension vector pairs by projecting the first and second lower dimension vectors in each of the batch of b lower dimension vector pairs to an augmented dimensional representation space having dimension d' to provide first and second augmented dimension vectors respectively, where d' is greater than d;

computing a similarity preservation loss and a redundancy reduction loss between the first and second augmented dimension vectors over the batch of b augmented dimension vector pairs; and optimizing the parameters of the dimensionality reduction model to minimize a total loss based on the computed similarity preservation loss and the computed redundancy reduction loss.

30. The method of claim 29, wherein said dimensionality reduction model comprises a parameterized neural network.

31. The method of claim 29, wherein the method further comprises:

generating a core representation of an input in the D-dimensional space; and normalizing the core representation of the input.

32. The method of claim 29, wherein the input represents one or more of a token, a document, a sentence, a paragraph, an image, a video, a waveform, a 3D model, a 3D point cloud, or embeddings of tabular data.

33. The method of claim 29, wherein the method further comprises:

processing the encoded output vector downstream of the dimensionality reduction model to perform a task.

34. The method of claim 33, wherein the task comprises a data retrieval task; wherein the data retrieval task is over a high-dimensional vector space; wherein the data retrieval task uses Euclidean metrics and/or non-Euclidean metrics.

35. The method of claim 29, wherein said generating a batch of b augmented dimension vector pairs uses a projector; and wherein the trained dimensionality reduction model after being trained does not include the projector.

36. The method of claim 29, wherein the dimensionality reduction model during training uses a linear encoder and a non-linear encoder; and wherein the trained dimensionality reduction model after being trained does not use a non-linear encoder.

37. A method performed by a processor and memory for training a neural network model, the neural network model comprising an encoder and a task-performing model downstream of the encoder, the method comprising:

providing a training set of input vectors and associated labels;

inputting the input vectors to the encoder, wherein the encoder comprises a dimensionality reduction model that receives an input vector in a D-dimensional representation space and generates an output vector in a d-dimensional representation space, where D is greater than d, the dimensionality reduction model being defined by one or more trainable parameters, the dimensionality reduction model being trained by a method comprising:

generating a batch of b positive pairs of training vectors in the D-dimensional space, each positive pair including a first training vector and a second training vector, wherein said generating comprises, for each positive pair:

selecting the first training vector from a set of training vectors in the D-dimensional representation space; and identifying a second training vector in the D-dimensional space that is proximate to the first training vector and shares the label with the first training vector;

generating a batch of b lower dimension vector pairs by encoding the first and second training vectors in each of the batch of b positive pairs to the d-dimensional representation space using the dimensionality reduction model to provide first and second lower dimension vectors, respectively;

generating a batch of b augmented dimension vector pairs by projecting the first and second lower dimension vectors in each of the batch of b lower dimension vector pairs to an augmented dimensional representation space having dimension d' to provide first and second augmented dimension vectors respectively, where d' is greater than d;

computing a similarity preservation loss and a redundancy reduction loss between the first and second augmented dimension vectors over the batch of b augmented dimension vector pairs;

optimizing the parameters of the dimensionality reduction model to minimize a total loss based on the computed similarity preservation loss and the computed redundancy reduction loss;

encoding the input vectors using the trained dimensionality reduction model to generate encoded output vectors; and training the task-performing model using the encoded output vectors and the input labels.

38. The method of claim 37, wherein the method further comprises:

generating a core representation of an input for each of the training set of input vectors the in the D-dimensional space.

39. The method of claim 38, wherein the method further comprises:

normalizing the core representation of the input.

40. The method of claim 37, wherein the training vectors in the training set represent one or more of a token, a document, an image, a part of an image, a video, a waveform, a 3D model, a 3D point cloud, or embeddings of tabular data.

* * * * *